(12) United States Patent
Robinson

(10) Patent No.: US 9,250,448 B2
(45) Date of Patent: Feb. 2, 2016

(54) SEGMENTED DIRECTIONAL BACKLIGHT AND RELATED METHODS OF BACKLIGHT ILLUMINATION

(75) Inventor: Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 504 days.

(21) Appl. No.: 13/495,898

(22) Filed: Jun. 13, 2012

(65) Prior Publication Data

US 2012/0314145 A1    Dec. 13, 2012

Related U.S. Application Data

(63) Continuation-in-part of application No. 13/300,293, filed on Nov. 18, 2011.

(60) Provisional application No. 61/496,319, filed on Jun. 13, 2011, provisional application No. 61/649,124, filed on May 18, 2012, provisional application No. 61/415,810, filed on Nov. 19, 2010.

(51) Int. Cl.
*G02B 27/22* (2006.01)
*F21V 8/00* (2006.01)

(52) U.S. Cl.
CPC ............ *G02B 27/225* (2013.01); *G02B 6/0048* (2013.01)

(58) Field of Classification Search
None
See application file for complete search history.

(56) References Cited

U.S. PATENT DOCUMENTS

| 5,959,664 | A | 9/1999 | Woodgate |
| 6,014,164 | A | 1/2000 | Woodgate et al. |
| 6,061,489 | A | 5/2000 | Ezra et al. |
| 6,075,557 | A | 6/2000 | Holliman et al. |
| 6,108,059 | A | 8/2000 | Yang |
| 6,199,995 | B1 | 3/2001 | Umemoto |
| 6,663,254 | B2 | 12/2003 | Ohsumi |
| 6,847,488 | B2 | 1/2005 | Travis |
| 6,870,671 | B2 | 3/2005 | Travis |
| 6,883,919 | B2 | 4/2005 | Travis |

(Continued)

FOREIGN PATENT DOCUMENTS

| EP | 0939273 | 1/1999 |
| EP | 0860729 B1 | 7/2006 |

(Continued)

OTHER PUBLICATIONS

International search report and written opinion of international searching authority for co-pending PCT application No. PCT/US2013/041192 mailed Aug. 28, 2013.

(Continued)

*Primary Examiner* — Jade R Chwasz
(74) *Attorney, Agent, or Firm* — Neil G. J. Mothew

(57) ABSTRACT

Backlit display systems, such as those employed with LED backlit displays, including those configured for autostereoscopic operation, may employ synchronization between the backlight and the presentation of sequential left and right eye images at a frame rate exceeding approximately 100 Hz. To successfully directionally illuminate isolated frames, the disclosed principles provide for segmenting the directional illumination and introducing a phase shifted, synchronized, pulsed drive scheme for the illumination segments. Accordingly, the principles disclosed herein are directed to segmented directional illumination systems and related techniques for segmented directional backlight illumination.

15 Claims, 21 Drawing Sheets

(56) References Cited

U.S. PATENT DOCUMENTS

| | | |
|---|---|---|
| 7,058,252 B2 | 6/2006 | Woodgate |
| 7,073,933 B2 * | 7/2006 | Gotoh et al. .................. 362/624 |
| 7,101,048 B2 | 9/2006 | Travis |
| 7,215,415 B2 | 5/2007 | Maehara |
| 7,410,286 B2 | 8/2008 | Travis |
| 7,430,358 B2 | 9/2008 | Qi et al. |
| 7,528,893 B2 | 5/2009 | Schultz |
| 7,545,429 B2 | 6/2009 | Travis |
| 7,660,047 B1 | 2/2010 | Travis et al. |
| 7,750,981 B2 | 7/2010 | Shestak |
| 7,750,982 B2 | 7/2010 | Nelson |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,216,405 B2 | 7/2012 | Emerton |
| 8,354,806 B2 | 1/2013 | Travis |
| 8,477,261 B2 | 7/2013 | Travis |
| 2003/0137738 A1 | 7/2003 | Ozawa et al. |
| 2004/0170011 A1 | 9/2004 | Kim et al. |
| 2005/0264717 A1 | 12/2005 | Chien et al. |
| 2006/0139447 A1 | 6/2006 | Unkrich |
| 2006/0158729 A1 * | 7/2006 | Vissenberg et al. ........... 359/462 |
| 2006/0291053 A1 | 12/2006 | Robinson et al. |
| 2006/0291243 A1 | 12/2006 | Niioka et al. |
| 2007/0025680 A1 | 2/2007 | Winston et al. |
| 2007/0115552 A1 | 5/2007 | Robinson et al. |
| 2008/0084519 A1 | 4/2008 | Brigham et al. |
| 2008/0086289 A1 | 4/2008 | Brott |
| 2008/0304282 A1 | 12/2008 | Mi et al. |
| 2008/0316768 A1 | 12/2008 | Travis |
| 2009/0016057 A1 | 1/2009 | Rinko |
| 2009/0140656 A1 | 6/2009 | Kohashikawa et al. |
| 2009/0160757 A1 | 6/2009 | Robinson |
| 2009/0225380 A1 | 9/2009 | Schwerdtner et al. |
| 2010/0053771 A1 | 3/2010 | Travis |
| 2010/0091254 A1 | 4/2010 | Travis |
| 2010/0177387 A1 | 7/2010 | Travis |
| 2010/0188438 A1 | 7/2010 | Kang |
| 2010/0214135 A1 | 8/2010 | Bathiche |
| 2010/0220260 A1 | 9/2010 | Sugita et al. |
| 2010/0231498 A1 | 9/2010 | Tarvis |
| 2010/0277575 A1 | 11/2010 | Ismael et al. |
| 2010/0300608 A1 | 12/2010 | Emerton et al. |
| 2011/0032483 A1 | 2/2011 | Hruska et al. |
| 2011/0044056 A1 | 2/2011 | Travis |
| 2011/0051237 A1 * | 3/2011 | Hasegawa et al. ........... 359/463 |
| 2011/0187293 A1 | 8/2011 | Travis |
| 2011/0188120 A1 | 8/2011 | Tabirian et al. |
| 2011/0216266 A1 | 9/2011 | Travis |
| 2011/0242298 A1 | 10/2011 | Bathiche |
| 2011/0285927 A1 | 11/2011 | Schultz et al. |
| 2012/0127573 A1 | 5/2012 | Robinson et al. |

FOREIGN PATENT DOCUMENTS

| | | |
|---|---|---|
| EP | 2003394 A2 | 12/2008 |
| JP | 08254617 A | 10/1996 |
| JP | 08340556 A | 12/1996 |
| JP | 2001093321 A | 4/2001 |
| JP | 2002049004 A | 2/2002 |
| JP | 2004319364 A | 11/2004 |
| JP | 2005135844 A | 5/2005 |
| JP | 2005183030 A | 7/2005 |
| JP | 2006004877 A | 1/2006 |
| JP | 2006031941 A | 2/2006 |
| JP | 2008204874 A | 9/2008 |
| KR | 10-2003-0064258 A | 7/2003 |
| KR | 1020110006773 A | 1/2011 |
| KR | 1020110017918 A | 2/2011 |
| KR | 1020110067534 A | 6/2011 |
| KR | 1020120048301 A | 5/2012 |

OTHER PUBLICATIONS

International search report and written opinion of international searching authority for co-pending PCT application No. PCT/US2013/041619 mailed Aug. 27, 2013.

International search report and written opinion of international searching authority for co-pending PCT application No. PCT/US2013/041655 mailed Aug. 27, 2013.

International search report and written opinion of international searching authority for co-pending PCT application No. PCT/US2013/041703 mailed Aug. 27, 2013.

International search report and written opinion of international searching authority for co-pending PCT application No. PCT/US2013/041548 mailed Aug. 27, 2013.

International search report and written opinion of international searching authority for co-pending PCT application No. PCT/US2013/041683 mailed Aug. 27, 2013.

International search report and written opinion of international searching authority for co-pending PCT application No. PCT/US2013/041228 mailed Aug. 23, 2013.

International search report and written opinion of international searching authority for co-pending PCT application No. PCT/US2013/041235 mailed Aug. 23, 2013.

International search report and written opinion of international searching authority for co-pending PCT application No. PCT/US2013/041697 mailed Aug. 23, 2013.

Kalantar, et al. "Backlight Unit With Double Surface Light Emission," J. Soc. Inf. Display, vol. 12, Issue 4, pp. 379-387 (Dec. 2004).

International Preliminary Report on Patentability in PCT/US2011/061511 dated May 21, 2013.

Travis, et al. "Backlight for view-sequential autostereo 3D".

International search report and written opinion of international searching authority in PCT/US2012/042279 dated Feb. 26, 2013.

International Search Report & Written Opinion for PCT/US12/37677 dated Jun. 29, 2012.

International Search Report & Written Opinion for PCT/US11/61511 dated Jun. 29, 2012.

* cited by examiner

SEGMENTED DIRECTIONAL BACKLIGHT AND RELATED METHODS OF BACKLIGHT ILLUMINATION

CROSS-REFERENCE TO RELATED APPLICATIONS

This non-provisional application claims priority to U.S. App. Ser. No. 61/496,319, entitled "Segmented directional backlight," filed Jun. 13, 2011. This application also claims priority to U.S. App. Ser. No. 61/649,124, entitled "Optical inline directional backlight apparatus and method thereof," filed May 18, 2012. Further, this application is a continuation-in-part of U.S. application Ser. No. 13/300,293, entitled "Directional flat illuminators," filed Nov. 18, 2011 which claims priority to U.S. App. Ser. No. 61/415,810, entitled "Directional flat illuminators," filed Nov. 19, 2010. All of the aforementioned applications in this paragraph are herein incorporated by reference for all purposes.

TECHNICAL FIELD

The present disclosure generally relates to displays, and more specifically, to two dimensional and three dimensional display technologies and components.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

Generally, current display technologies may include functionality to deploy, view and/or display three dimensional (3D) content. Recently, the increased demand for such functionality has driven the need for enhanced performance of display technology. Display technology may employ the use of plasma and liquid crystal displays (LCDs) for 2D and 3D content. However, LCD displays struggle to meet various update requirements due to the modest response times and continuous scrolling and line-by-line updating provided in scrolling stereoscopic displays.

BRIEF SUMMARY

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in patent application Ser. No. 13/300,293, which is herein incorporated by reference, in its entirety.

Backlight units (BLUs) that employ folded optical systems such as stepped imaging directional backlights may be advantageously transparent to normally incident light. The transparency property enables valve array apparatuses such as stacked and tiled composite illumination systems of the present embodiments, where for example at least part of adjacent illuminators are hidden by or illuminate through each other. Such valve array illumination apparatus embodiments lead to increased brightness, local independent illumination and directional capabilities.

Directional backlighting of LCDs provides for efficient, private, large viewing angle, autostereoscopic and conventional 2D viewing. Autostereoscopic operation may employ synchronization between the directional backlight and the presentation of sequential left and right eye images at a frame rate exceeding approximately 100 Hz. To successfully illuminate isolated frames, one technique may include segmenting the directional illumination and introduce a phase shifted, synchronized, pulsed drive scheme for the segments. In general, the embodiments herein are directed to segmented directional illumination systems and related illumination methods.

In one aspect, segmented illumination systems for use with an electronic stereoscopic display system having a sequentially scanning display is provided. In one embodiment, such a segmented illumination system may comprise a plurality of directional illumination segments corresponding to a plurality of display segments of the sequentially scanning display, where the plurality of directional illumination segments are arranged contiguously in a direction of the sequential scan. In addition, such a system may include a plurality of illumination units corresponding to each of the plurality of directional illumination segments for providing illumination to said corresponding directional illumination segments, wherein the plurality of directional illumination segments thereby directionally illuminate the corresponding plurality of display segments, for example, for autostereoscopic display of stereoscopic images. In some embodiments the illumination units may be LEDs or LED arrays. In exemplary embodiments, select ones of the plurality of illumination units provide illumination to the corresponding directional illumination segments, which in turn provide corresponding first direction or second direction to the display segments, in synchronization with right eye and left eye imagery provided by the corresponding plurality of display segments.

In another aspect, electronic stereoscopic display systems having a sequentially scanning display are provided. In one embodiment, such a display system may comprise a plurality of liquid crystal display segments for providing left eye and right eye imagery in a sequential scan. In addition, such display systems may provide a plurality of directional illumination segments corresponding to the plurality of liquid crystal display segments, wherein the plurality of directional illumination segments are arranged contiguously in the direction of the sequential scan. Also in such embodiments, a plurality of illumination units may be provided. One or more of the illumination units may correspond to each of the plurality of directional illumination segments for providing illumination to the corresponding directional illumination segments. The plurality of directional illumination segments thereby directionally illuminate, in a first or second direction, the corresponding plurality of liquid crystal display segments. Additionally, the plurality of illumination units may provide the illumination to the corresponding directional illumination segments, which in turn provide corresponding first direction or second direction to the display segments, in synchronization with selected left eye and right eye imagery provided by the corresponding plurality of liquid crystal display segments.

In other aspects, methods for providing illumination in an electronic stereoscopic display system having a sequentially scanning display are disclosed. In one embodiment, such a method may comprise arranging a plurality of directional illumination segments, each corresponding to a plurality of display segments of the sequentially scanning display, contiguously in a direction of the sequential scan. In advantageous embodiments, the display segments may be liquid crystal segments, and may provide left eye and right eye imagery in a scrolling scan. Additionally, exemplary methods may also include selectively illuminating one or more of the plurality of directional illumination segments such that corresponding directional illumination segments illuminate the display segments in a first or second direction in synchronization with corresponding left eye or right eye imagery provided by the corresponding one or more of the plurality of display segments. These illumination units may comprise LEDs or LED arrays. The illuminated one or more directional illumination segments thereby directionally illuminate the corresponding one or more display segments having the left or right eye imagery.

Additionally, embodiments may relate to a directional backlight apparatus and a directional display which may incorporate the directional backlight apparatus. Such an apparatus may be used for autostereoscopic displays, privacy displays, multi-user displays and other directional display applications.

In embodiments, the optical function of the directional backlight can be provided by multiple stepped waveguides in which light passes from an external light source passes through a surface of the stepped waveguide in addition to the input aperture of the stepped waveguide. Advantageously such an arrangement provides additional optical functions to be provided in addition to the optical function provided by the respective stepped waveguide while preserving the advantages of high efficiency, large back working distance and thin form factor of the respective stepped waveguide.

Advantageously such an arrangement achieves a combination of optical functions including, but not limited to, increased brightness autostereoscopic display, a controllable landscape/portrait display, a 2D/3D switchable display, increased display area, and high efficiency color display illumination. Further the optical properties of the output can be modified to increase uniformity and widen viewing angle. Further, multiple viewers can be tracked independently.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1A:
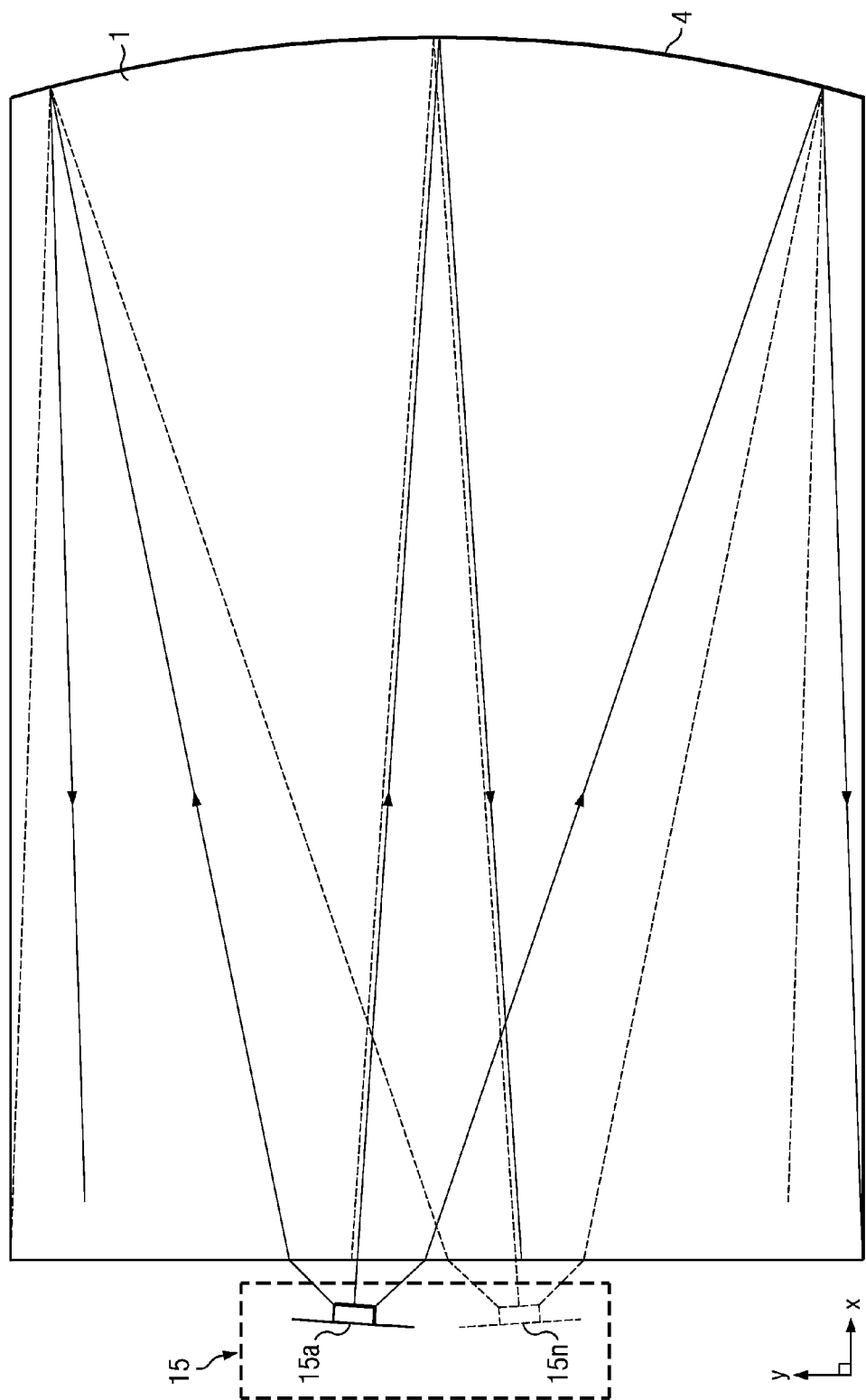
FIG. 1A is a schematic diagram illustrating a front view of light propagation in one embodiment of an optical valve apparatus, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (which is sometimes referred to as a "light valve"). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in patent application Ser. No. 13/300,293, which is herein incorporated by reference in its entirety.

As used herein, an optical inline directional backlight ("OI-DBL") is an optical structure that may be a type of light guiding structure or device referred to as, for example, a uni-directional imaging directional backlight, or a stepped waveguide OI-DBL.

As used herein, examples of an imaging directional backlight include a stepped waveguide imaging directional backlight, a folded imaging directional backlight, a wedge type directional backlight, an optical valve, or an optical inline directional backlight.

Additionally, as used herein, a stepped waveguide imaging directional backlight may be at least one of an optical valve or an optical inline directional backlight. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

Moreover, as used, a folded imaging directional backlight may be at least one of a wedge type directional backlight, or an optical valve.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
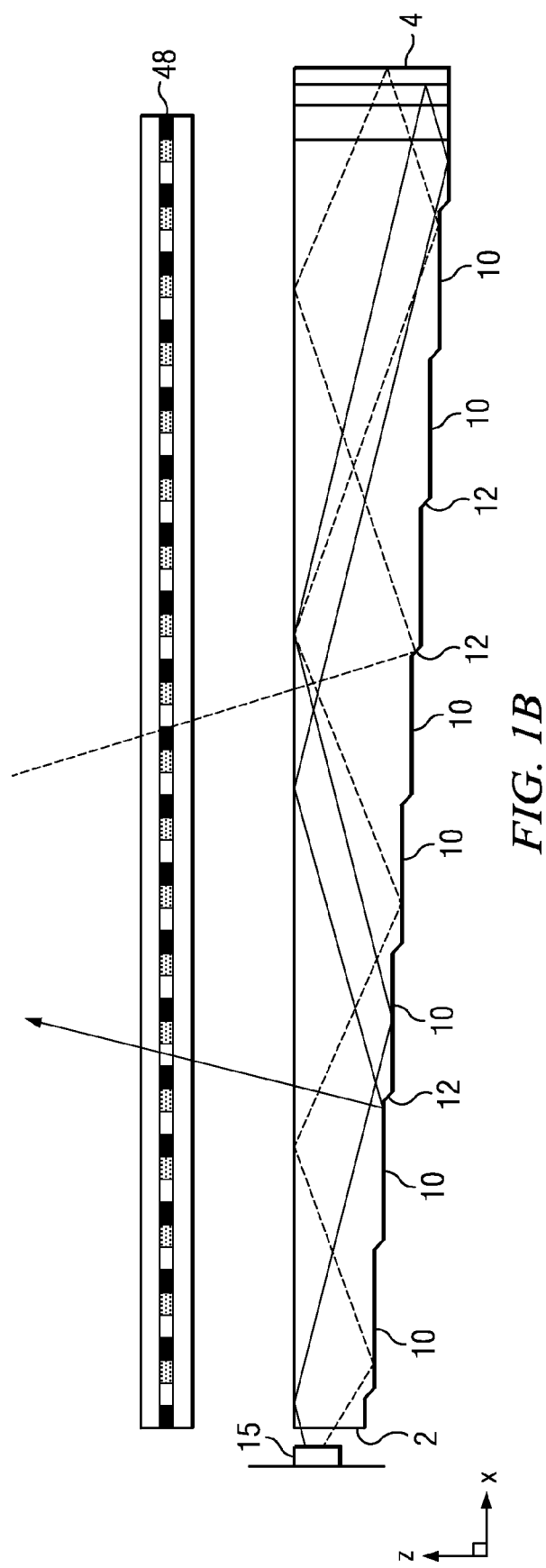
FIG. 1B is a schematic diagram illustrating a side view of light propagation in one embodiment of the optical valve apparatus of FIG. 1A, in accordance with the present disclosure.

FIG. 1A is a schematic diagram illustrating a front view of light propagation in one embodiment of an optical valve structure, and FIG. 1B is a schematic diagram illustrating a side view of light propagation in the optical valve structure of FIG. 1A.

FIG. 1A illustrates a front view in the xy plane of an optical valve, and includes an illuminator array 15 which may be used to illuminate a stepped waveguide 1. Illuminator array 15 includes illuminator elements 15*a* through illuminator element 15*n* (where n is an integer greater than one). In one example, the stepped waveguide 1 of FIG. 1A may be a stepped, display sized waveguide 1. Illumination elements 15*a* through 15*n* may be light emitting diodes (LEDs). Although LEDs are discussed herein as illuminator elements 15*a*-15*n*, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, LCD 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another. Further, in FIG. 1B, the stepped waveguide 1 may have a thin end 2 and a thick end 4. Although the LCD 48 may be referred to herein for discussion purposes, other spatial light modulators or displays may be used including LCOS, DLP devices, and so forth, as this illuminator may work in reflection.

The operation of an optical valve that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
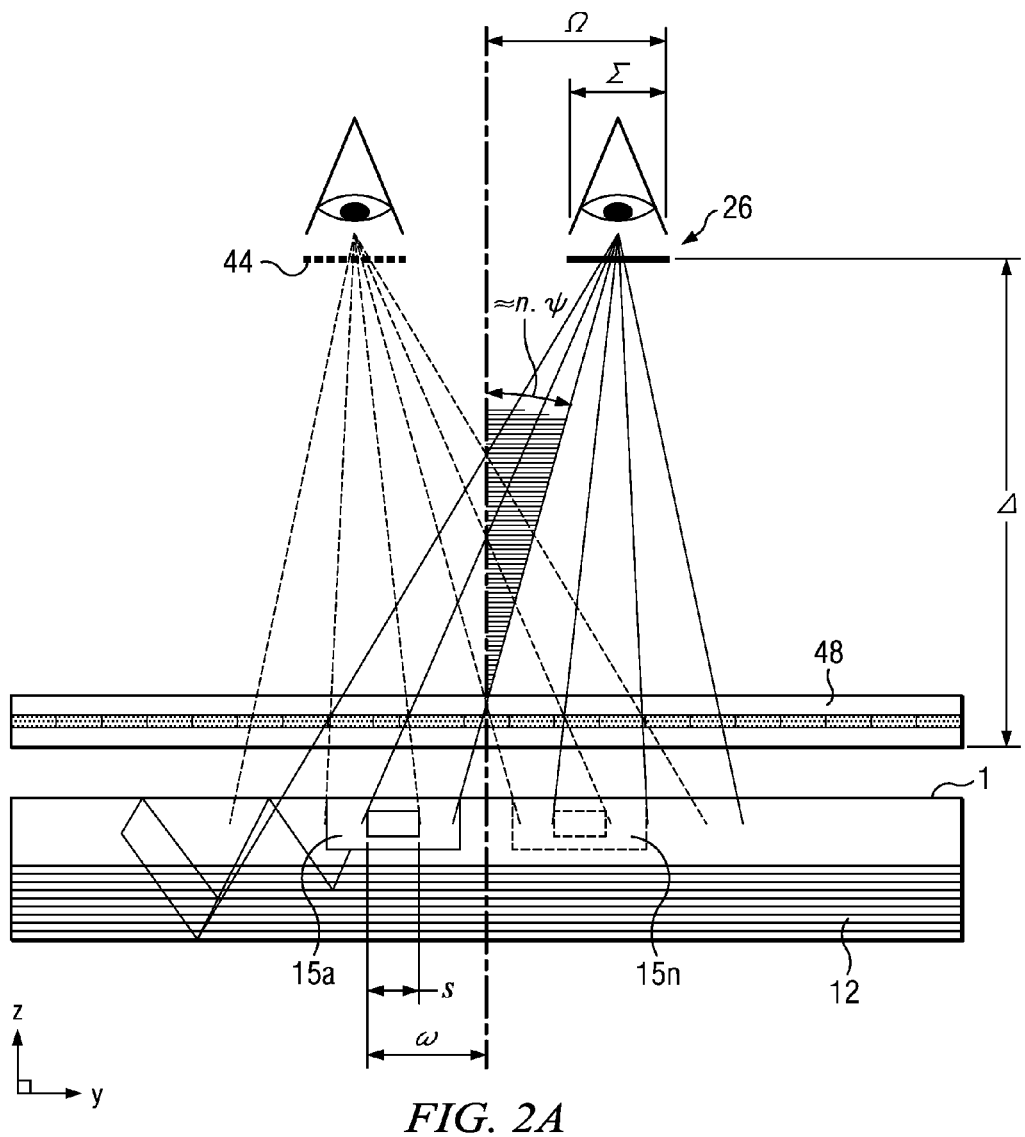
FIG. 2A is a schematic diagram illustrating in a top view of light propagation in another embodiment of an optical valve apparatus, in accordance with the present disclosure.
Figure 2B:
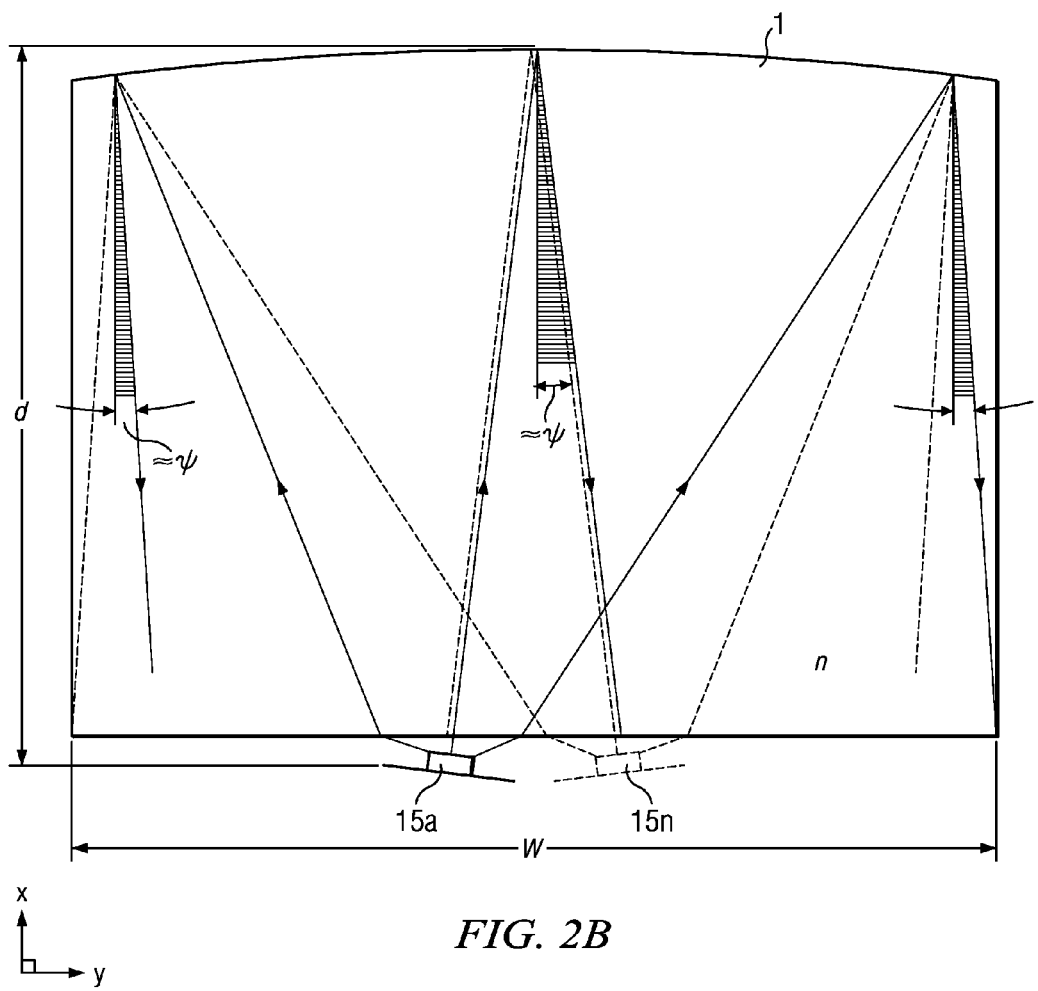
FIG. 2B is a schematic diagram illustrating light propagation in a front view of the optical valve apparatus of FIG. 2A, in accordance with the present disclosure.
Figure 2C:
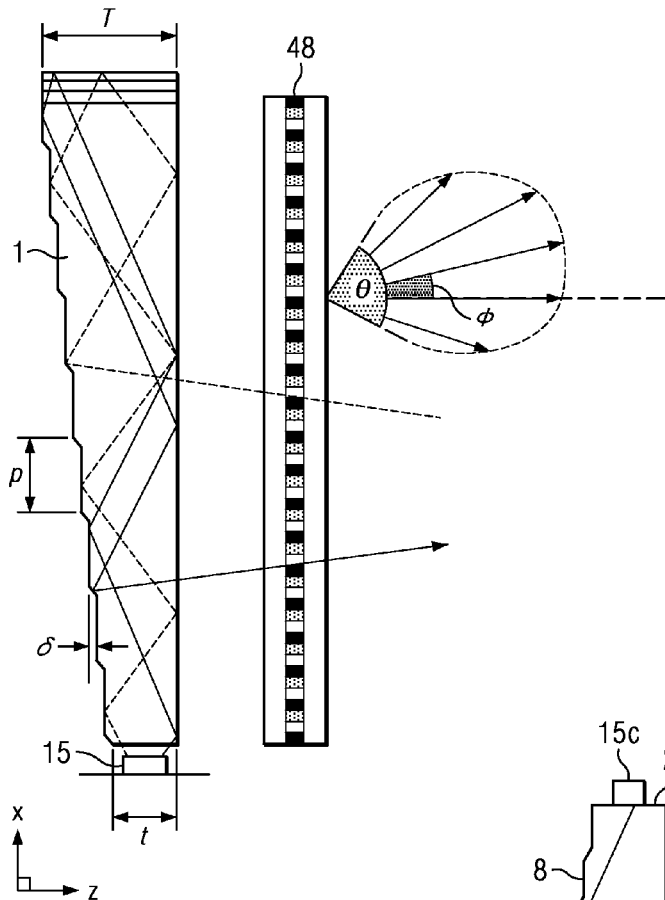
FIG. 2C is a schematic diagram illustrating light propagation in a side view of the optical valve apparatus of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in an optical valve system, FIG. 2B is a schematic diagram illustrating in a front view, propagation of light in an optical valve system, and FIG. 2C is a schematic diagram illustrating in side view propagation of light in an optical valve system. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

Figure 3:
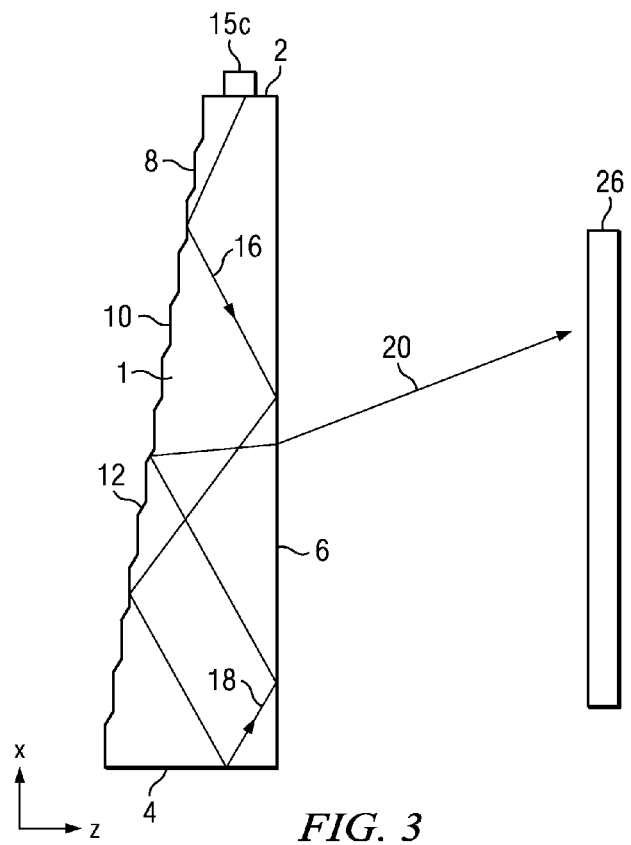
FIG. 3 is a schematic diagram illustrating in a side view of an optical valve apparatus, in accordance with the present disclosure.

FIG. 3 is a schematic diagram illustrating in side view an optical valve. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2.

Figure 4A:
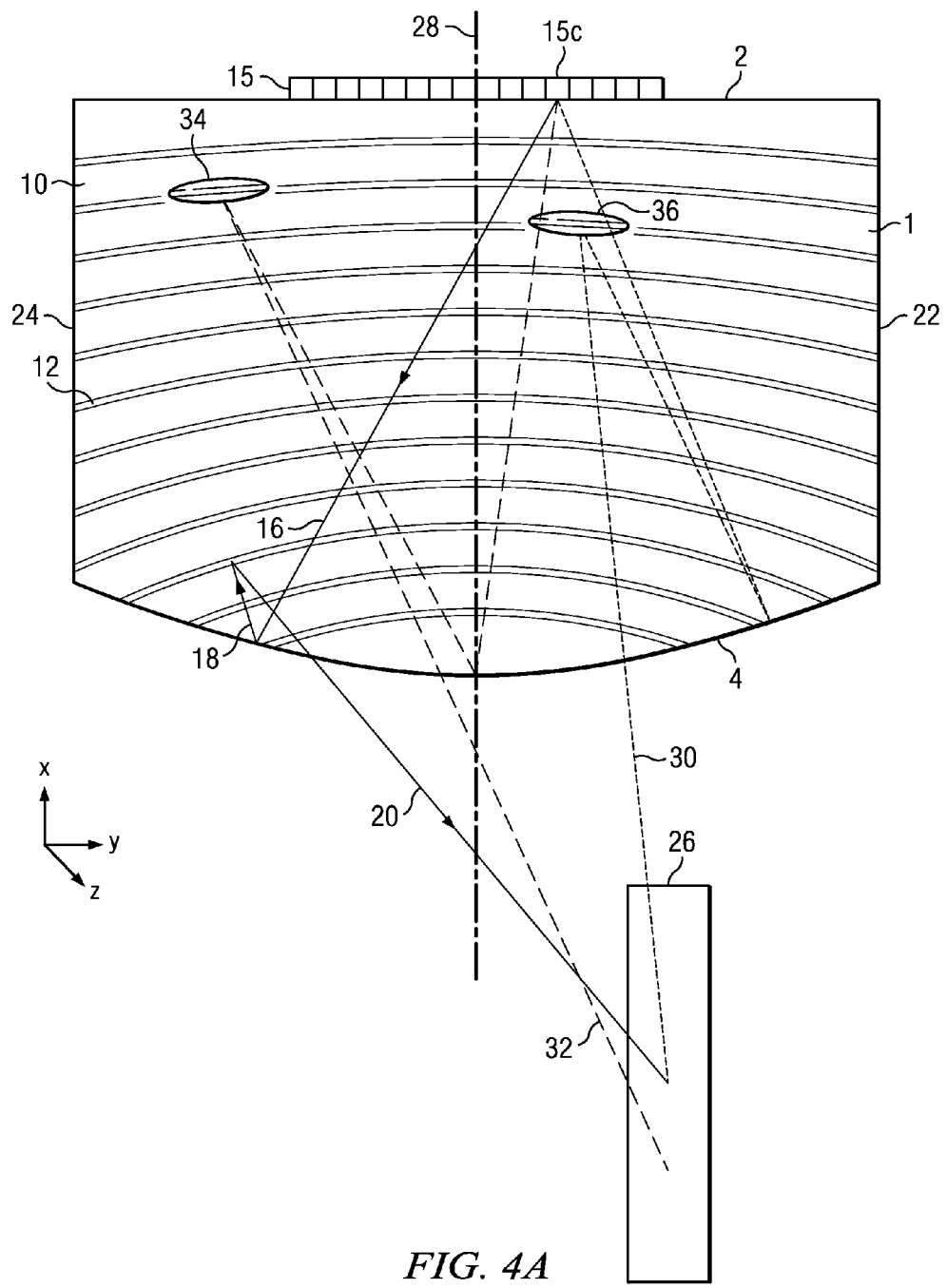
FIG. 4A is schematic diagram illustrating in a front view, generation of a viewing window in an optical valve apparatus and including curved light extraction features, in accordance with the present disclosure.

FIG. 4A is a schematic diagram illustrating in front view an optical valve which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the optical valve may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
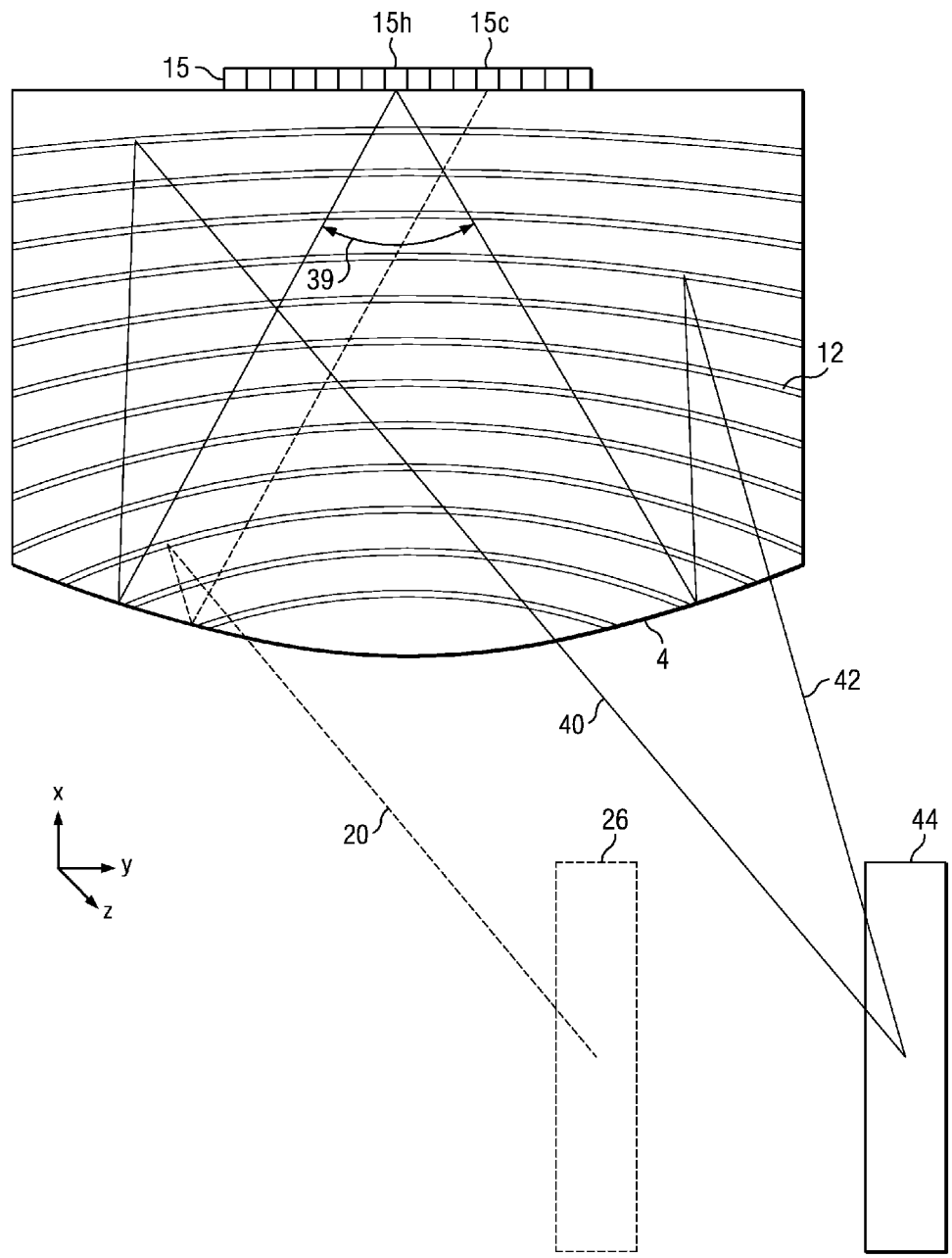
FIG. 4B is a schematic diagram illustrating in a front view, generation of a first and a second viewing window in an optical valve apparatus and including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15h of the illuminator array 15. The curvature of the reflective surface on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
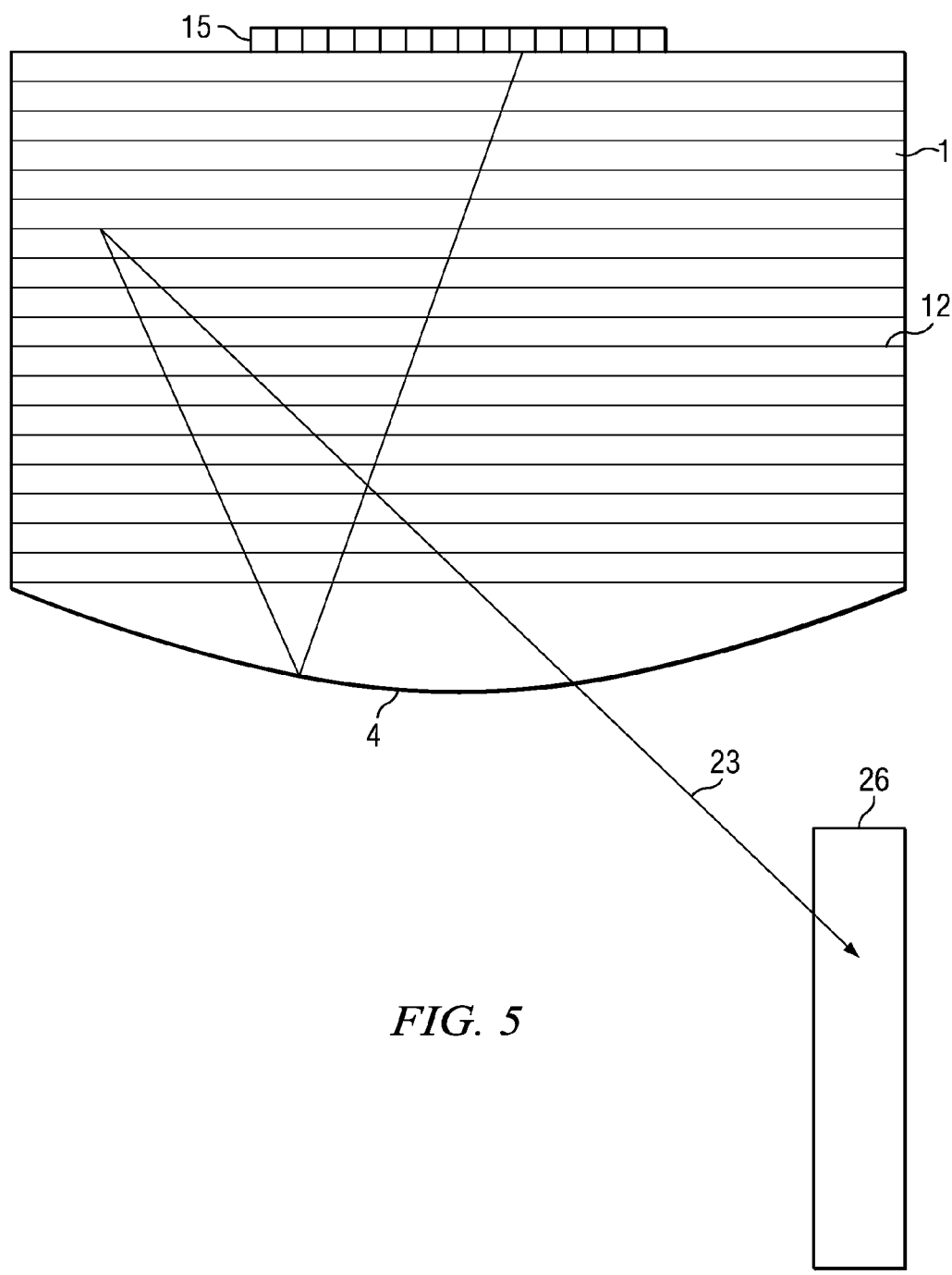
FIG. 5 is a schematic diagram illustrating generation of a first viewing window in an optical valve apparatus including linear light extraction features, in accordance with the present disclosure.

FIG. 5 is a schematic diagram illustrating in front view an embodiment of an optical valve having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
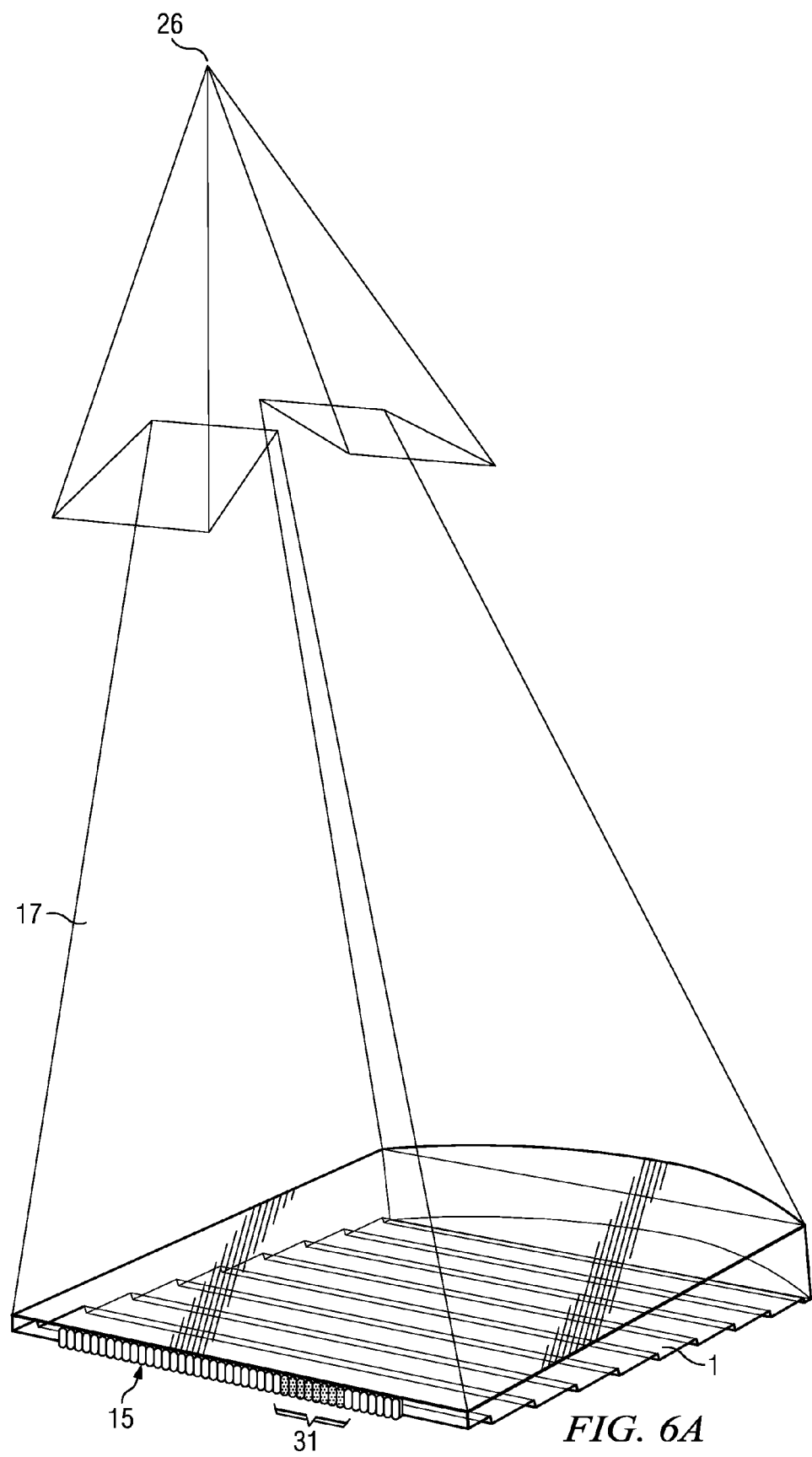
FIG. 6A is a schematic diagram illustrating one embodiment of the generation of a first viewing window in a time multiplexed imaging directional backlight apparatus, in accordance with the present disclosure.
Figure 6B:
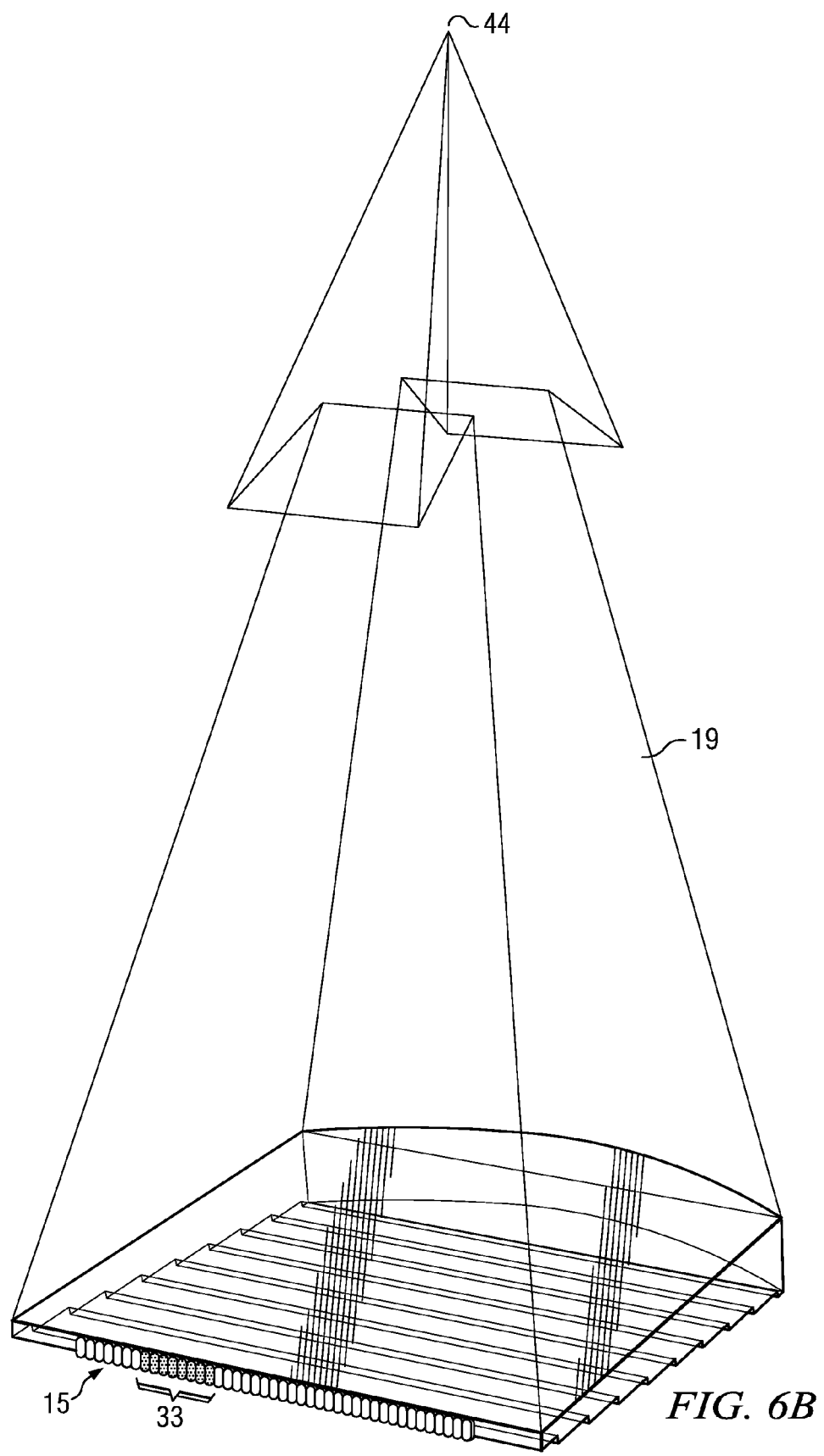
FIG. 6B is a schematic diagram illustrating another embodiment of the generation of a second viewing window in a time multiplexed optical valve apparatus in a second time slot, in accordance with the present disclosure.
Figure 6C:
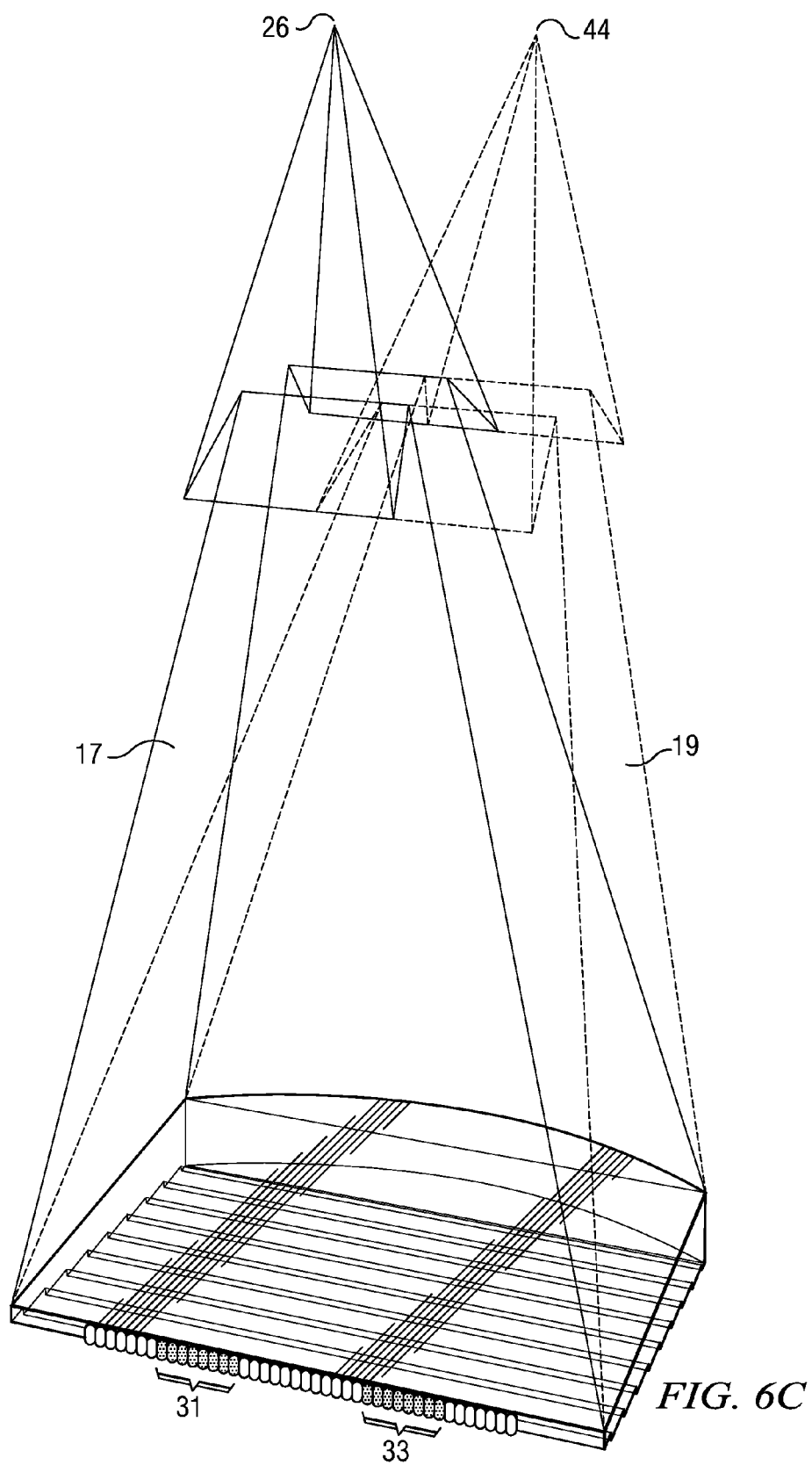
FIG. 6C is a schematic diagram illustrating another embodiment of the generation of a first and a second viewing window in a time multiplexed optical valve apparatus, in accordance with the present disclosure.

FIG. 6A is a schematic diagram illustrating one embodiment of the generation of a first viewing window in a time multiplexed imaging directional backlight apparatus, namely an optical valve apparatus in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional backlight apparatus. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all imaging optical valve systems or imaging directional backlights. Note that illuminator element groups 31, 33 each include one or more illumination elements from illumination elements 15a to 15n, where n is an integer greater than one.

Figure 7:
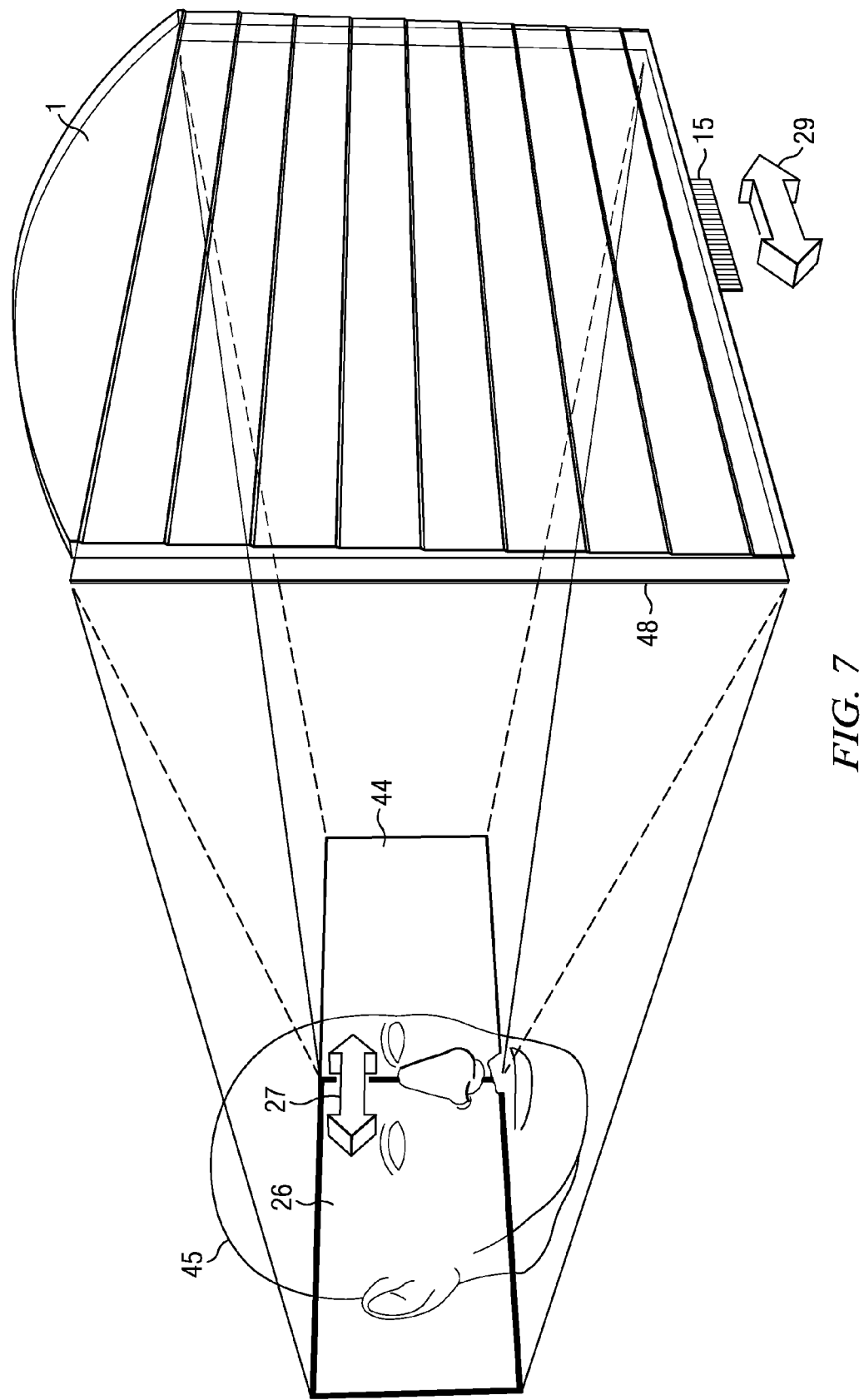
FIG. 7 is a schematic diagram illustrating an observer tracking autostereoscopic display apparatus including a time multiplexed optical valve apparatus, in accordance with the present disclosure.

FIG. 7 is a schematic diagram illustrating one embodiment of an observer tracking autostereoscopic display apparatus including a time multiplexed optical valve apparatus. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all imaging optical valve systems or imaging directional backlights.

Figure 8:
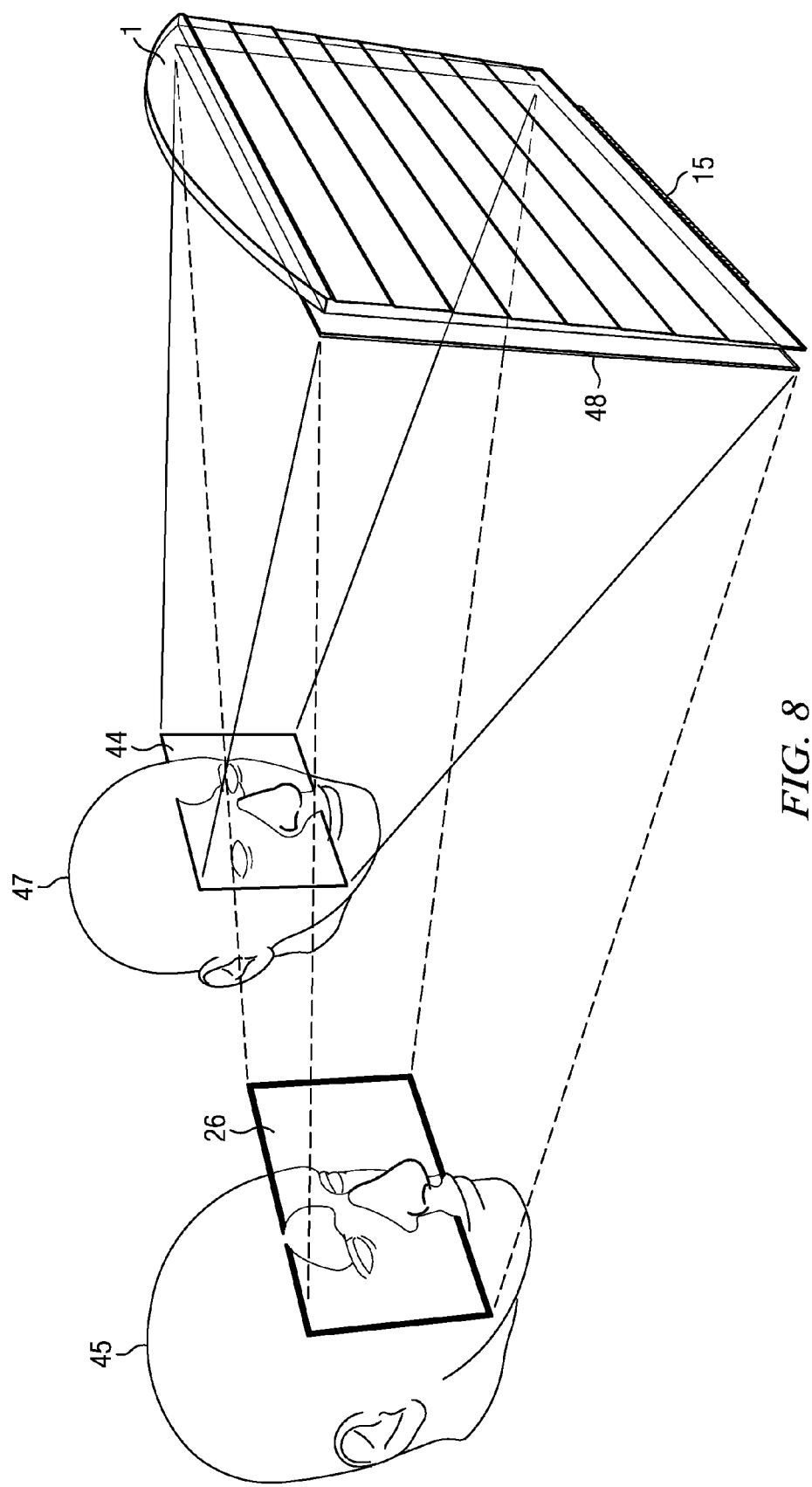
FIG. 8 is a schematic diagram illustrating a multi-viewer display apparatus including a time multiplexed optical valve apparatus, in accordance with the present disclosure.

FIG. 8 is a schematic diagram illustrating one embodiment of a multi-viewer display apparatus which includes a time multiplexed optical valve apparatus as an example of an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
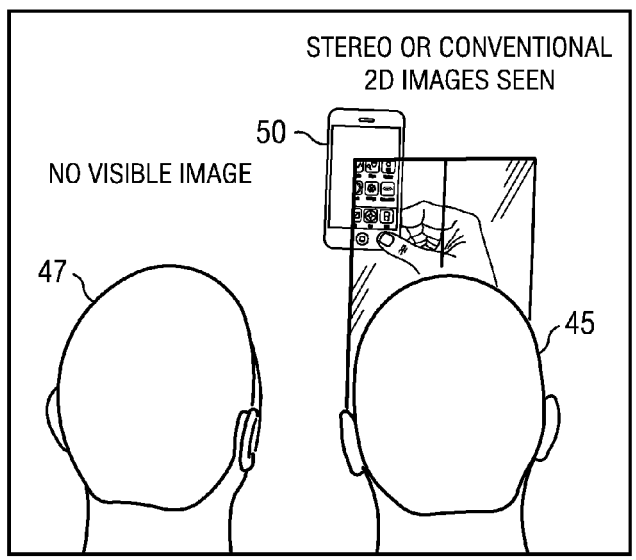
FIG. 9 is a schematic diagram illustrating a privacy display apparatus including an optical valve apparatus, in accordance with the present disclosure.

FIG. 9 is a schematic diagram illustrating a privacy display apparatus which includes an imaging directional backlight apparatus, and as illustrated, an optical valve. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
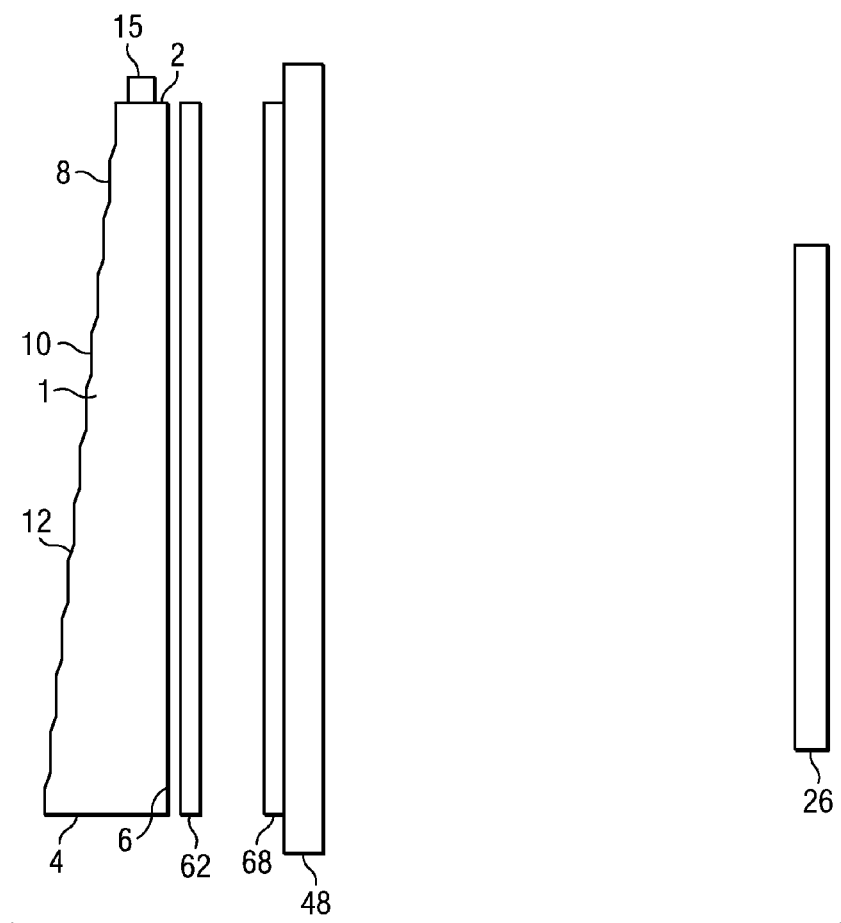
FIG. 10 is a schematic diagram illustrating in side view, the structure of a time multiplexed optical valve apparatus, in accordance with the present disclosure.

FIG. 10 is a schematic diagram illustrating in side view the structure of a time multiplexed optical valve apparatus as an example of an imaging directional backlight. Further, FIG. 10 shows in side view an autostereoscopic display, which may include the stepped waveguide 1 and a Fresnel lens 62 arranged to provide the viewing window 26 for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

Figure 11A:
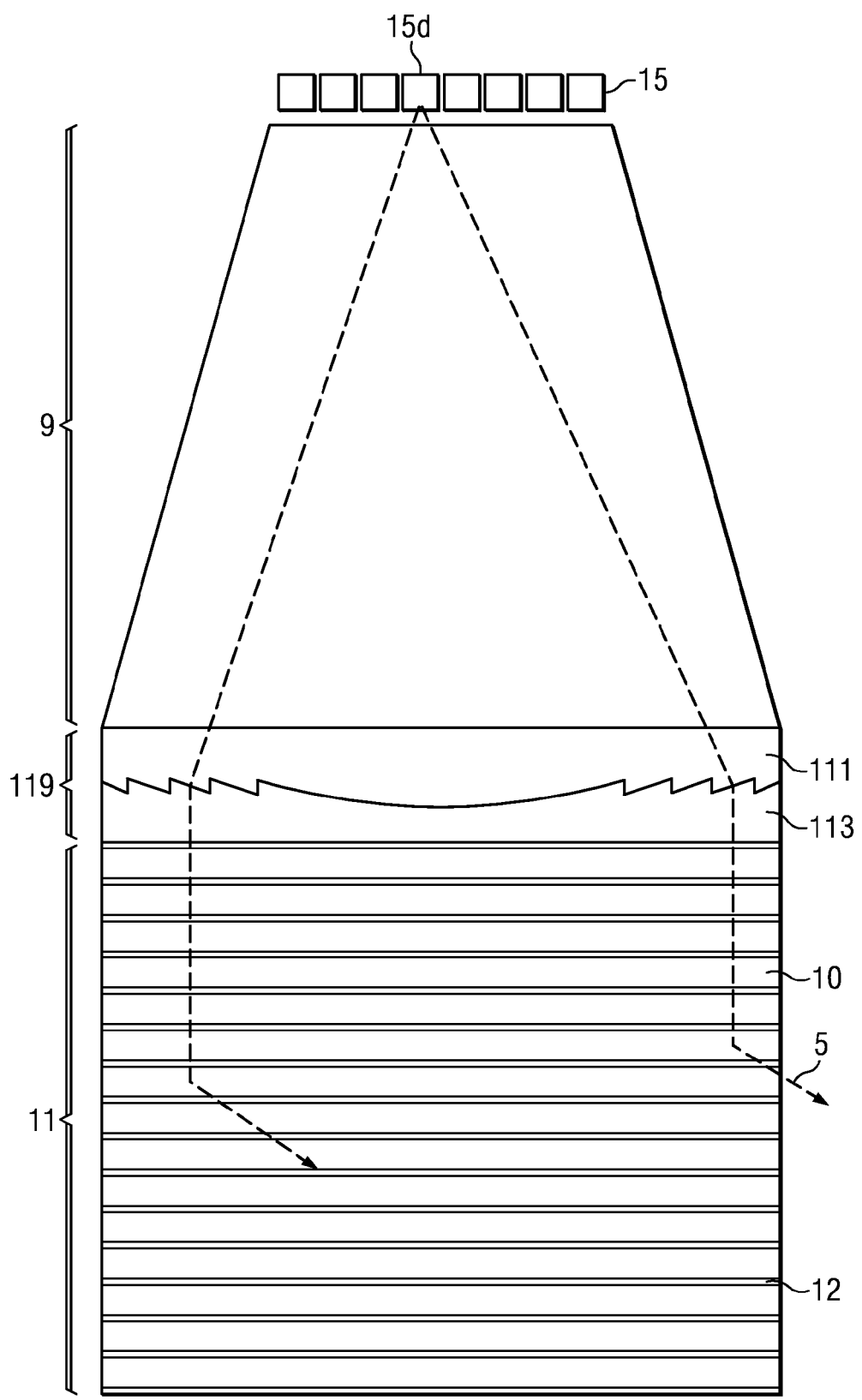
FIG. 11A is a schematic diagram illustrating a front view of an optical inline directional backlight apparatus as another example of an imaging directional backlight apparatus, in accordance with the present disclosure.

FIG. 11A is a schematic diagram illustrating a front view of an optical inline directional backlight apparatus as another example of an imaging directional backlight apparatus. Further, FIG. 11A shows another imaging directional backlight apparatus described herein as an optical inline directional backlight. The optical inline directional backlight may operate in a similar manner to the optical valve, with the difference that light may not be reversed at the end interface. Instead, the optical inline directional backlight may allow light to fan out in a guiding region before refracting light approximately half way down its length into a region containing extraction features 12 and in which light may be directed out of the guide and toward a viewer. Light emitted from an illuminator element 15d (e.g., LED) may expand within a guiding region 9 before being redirected with a refractive imaging element 119, which may include in this case, a Fresnel lens surface between dissimilar refractive index materials 111 and 113. Extraction features 12 may extract the light between guiding regions 10 to provide directed rays 5, which may converge to form viewing windows in a similar manner to the optical valve. Effectively, the optical inline directional backlight can be constructed and may operate as an unfolded optical valve in which the reflecting mirror 4 may be replaced by the refractive cylindrical lens 119.

Figure 11B:
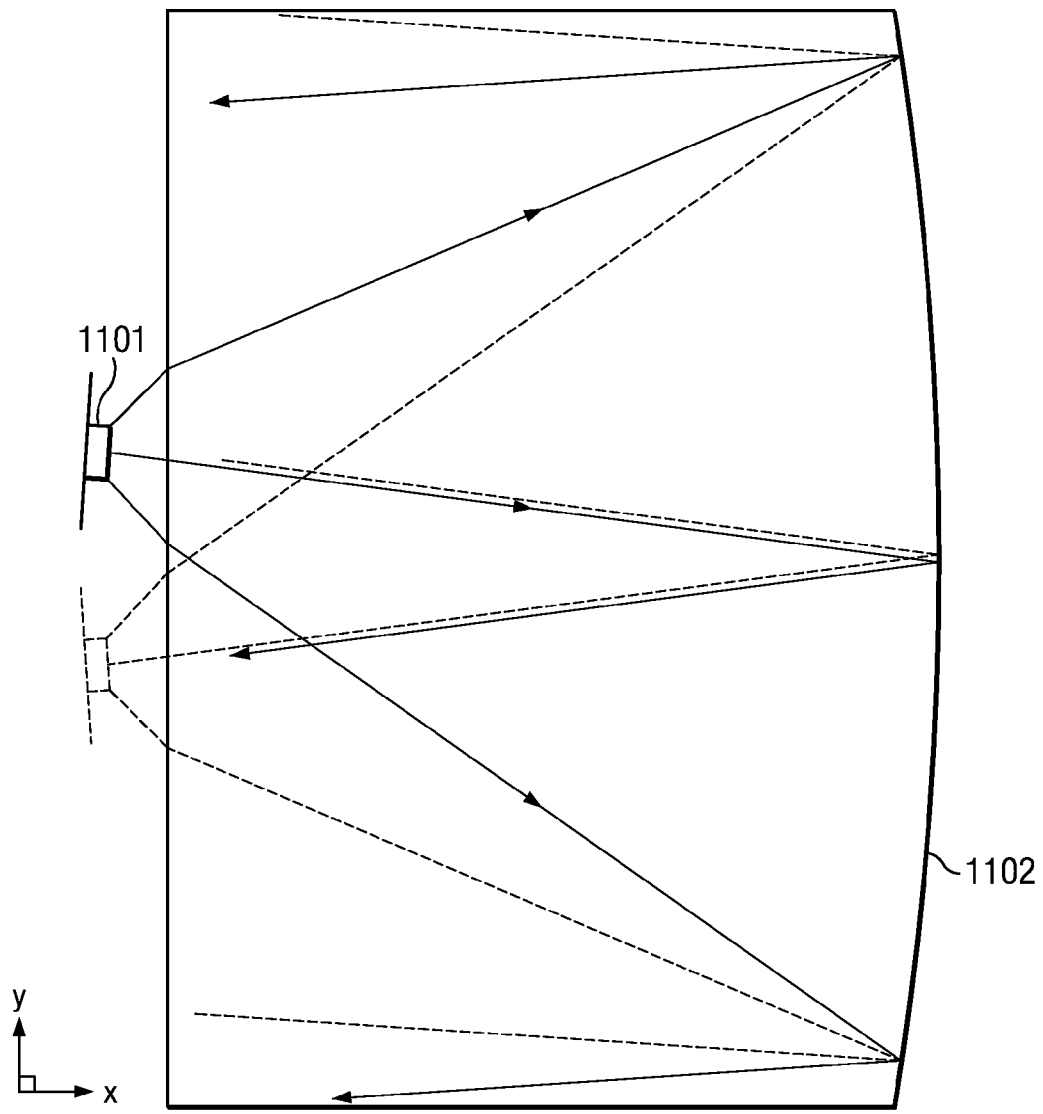
FIG. 11B is a schematic diagram illustrating a front view of a wedge type directional backlight apparatus, in accordance with the present disclosure.
Figure 11C:
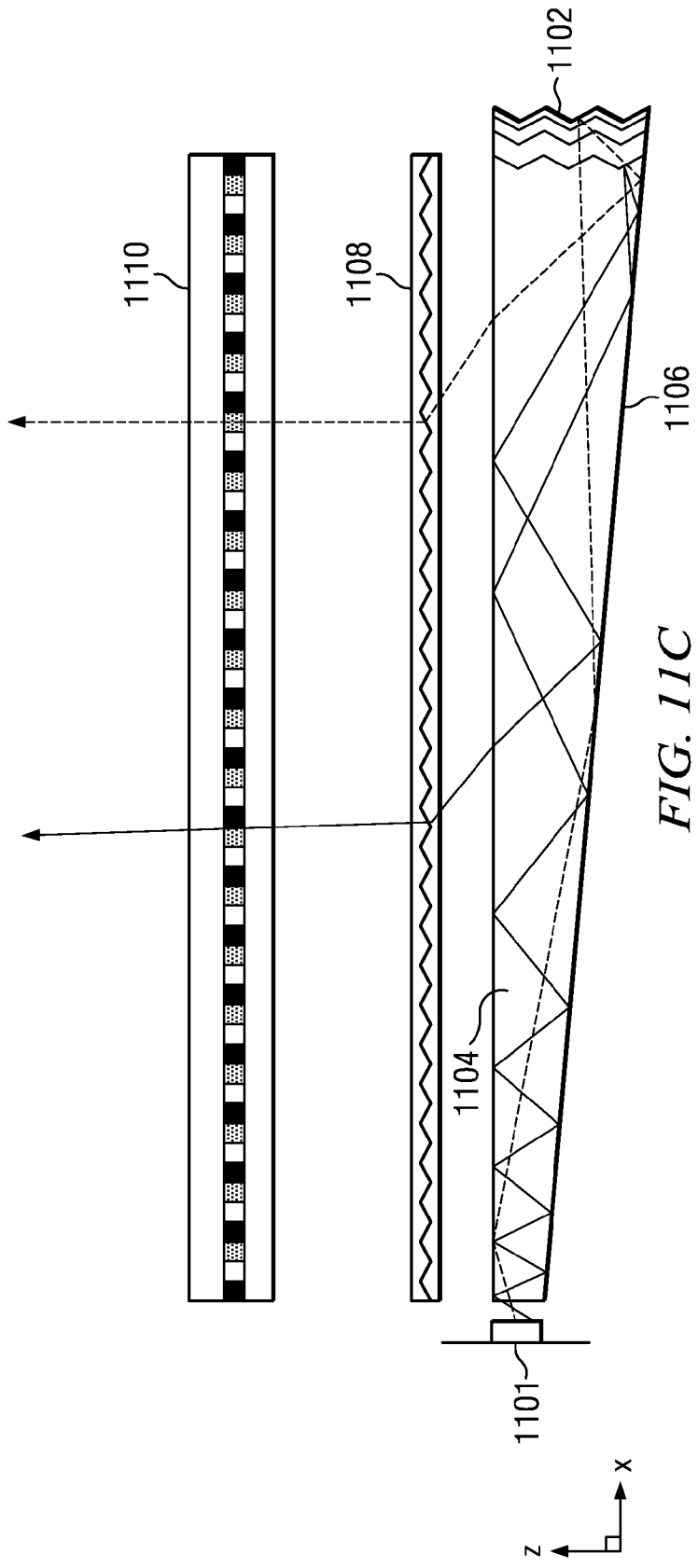
FIG. 11C is a schematic diagram illustrating a side view of a wedge type directional backlight apparatus, in accordance with the present disclosure.

FIG. 11B is a schematic diagram illustrating a front view of another imaging directional backlight apparatus, as illustrated, a wedge type directional backlight, and FIG. 11C is a schematic diagram illustrating a side view of the same wedge type directional backlight apparatus. A wedge type directional backlight is generally discussed by U.S. Pat. No. 7,660, 047 and entitled "Flat Panel Lens," which is herein incorporated by reference in its entirety. The structure may include a wedge type waveguide 1104 with a bottom surface which may be preferentially coated with a reflecting layer 1106 and with an end corrugated surface 1102, which may also be preferentially coated with a reflecting layer 1106. As shown in FIG. 11C, light may enter the wedge type waveguide 1104 from local sources 1101 and the light may propagate in a first direction before reflecting off the end surface. Light may exit the wedge type waveguide 1104 while on its return path and may illuminate a display panel 1110. By way of comparison with an optical valve, a wedge type waveguide provides extraction by a taper that reduces the incidence angle of propagating light so that when the light is incident at the critical angle on an output surface, it may escape. Escaping light at the critical angle in the wedge type waveguide propagates substantially parallel to the surface until deflected by a redirection layer 1108 such as a prism array. Errors or dust on the wedge type waveguide output surface may change the critical angle, creating stray light and uniformity errors. Further, an imaging directional backlight that uses a mirror to fold the beam path in the wedge type directional backlight may employ a faceted mirror that biases the light cone directions in the wedge type waveguide. Such faceted mirrors are generally complex to fabricate and may result in illumination uniformity errors as well as stray light.

The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

It should be noted that embodiments of the present disclosure may be used in a variety of optical systems and projection systems. The embodiments may include or work with a variety of displays, display screens, projectors, projection systems, optical components, computer systems, processors, self-contained projector systems, entertainment, visual and/or audiovisual systems and electrical and/or optical devices. Aspects of the present disclosure may be used with practically any apparatus related to optical and electrical devices, optical systems, entertainment systems, presentation systems or any apparatus that may contain any type of optical system. Accordingly, embodiments of the present disclosure may be employed in entertainment systems, optical systems, devices used in visual and/or optical presentations, visual peripherals and so on, and in a number of computing environments including the Internet, intranets, local area networks, wide area networks and so on.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

As mentioned above, backlit display systems, such as those employed with LED backlit displays, including those configured for autostereoscopic operation, may employ synchronization between the backlight and the presentation of sequential left and right eye images at a frame rate exceeding approximately 100 Hz. To successfully illuminate isolated frames, one technique may include segmenting the illumination and introducing a phase shifted, synchronized, pulsed drive scheme for the illumination segments. Accordingly, the embodiments herein are directed to segmented directional illumination systems and related techniques for segmented backlight illumination.

Figure 12:
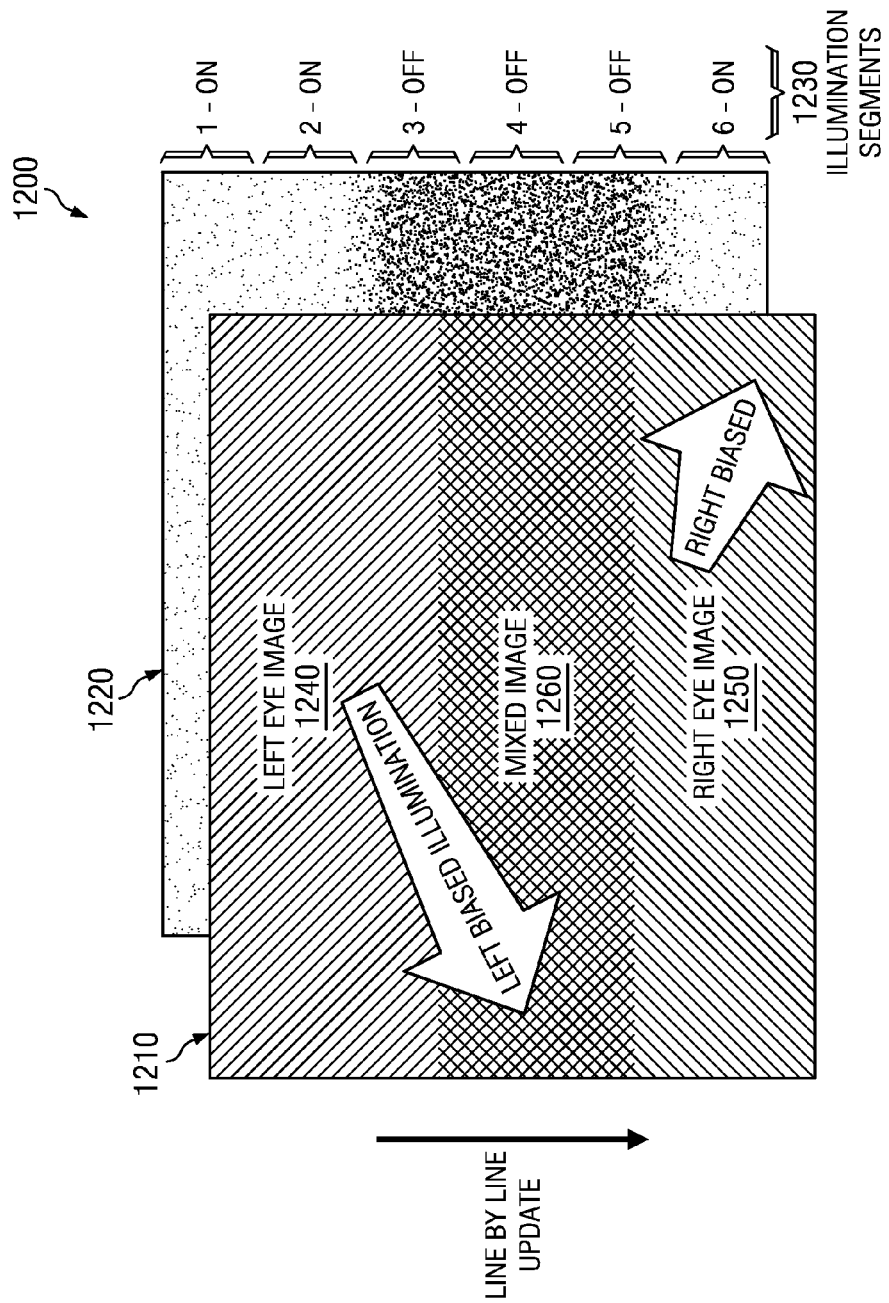
FIG. 12 is a schematic diagram illustrating one embodiment of a segmented directionally illuminated autostereoscopic LCD display, in accordance with the present disclosure.

In accordance with the disclosed principles, various directional backlighting and illuminators may be used to form near-independent segments. One embodiment of a basic segmented directional illumination system 1200 is shown in FIG. 12. In FIG. 12, an LCD 1210 may be updated line by line in a continuously scrolling fashion. Although a top-to-bottom scrolling is illustrated in FIG. 12, any type of scrolling update of a display may be employed with the principles of the present disclosure. The finite switching speed of the liquid crystal material may introduce a mixed image region 1260 where a Right Eye Image 1250 may be replaced gradually (illustrated by the "Mixed Image" 1260) by a Left Eye Image 1240 and vice versa, as shown in FIG. 12. The mixed image region 1260 may follow the address line and may appear to scroll as one eye image is updated with the other eye image in a scrolling fashion. In some embodiments, the disclosed principles may also provide for left eye directional illumination to one or more of a plurality of viewer left eyes and right eye directional illumination to one or more of a plurality of viewer right eyes in synchronization with selected left eye and right eye imagery. Such embodiments are beneficial in applications having multiple viewers, even in cinema environments. Moreover, some embodiments of the disclosed principles may also provide for such left and right eye directional illumination to one or more viewers using certain illumination units (e.g., LEDs) of the backlight system, while also illumination both left and right eye imagery in other directions using one or more other illumination units. Such embodiments would allow for one or more viewers to view an autostereoscopic 3D image, while other viewers would view a standard 2D image, depending on the positioning of the viewers with respect to the display.

Good stereoscopic systems may isolate left and right eye images such that clear images are seen in the correct eye. To isolate images and reduce cross-talk, virtually no light may illuminate by the backlight 1220 in the mixed image region 1260. The regions that may have correct settled imagery may then be illuminated with correct directionality on the corresponding image segment to enable displayed stereoscopic imagery to be seen alternately in each eye. This may be achieved by first segmenting the directional backlight 1220 into illumination segments 1230, and then by modulating the segmented directional backlight 1220 in phase with the settled imagery segments. In the illustrated embodiment, illumination segments 1 and 2 are shown as being directionally illuminated in synchronization with the left eye image 1240, for example, for autostereoscopic viewing. In addition, illumination segment 6 is shown as directionally illuminated in a different direction in synchronization with the right eye image 1250. Consequently, illumination segments 3, 4 and 5 are not illuminated while in synchronization with the mixed image 1260 so as not to illuminate such mixed image portion(s) to the viewer. This may result in a 'jerky' scrolling black region that follows the line by line update, but this unlit area substantially corresponds to the mixed image region 1260 and thus remains substantially invisible to the viewer due to the >100 Hz frame rate of the display 1200, which is typical in stereoscopic displays.

Substantial optical isolation of the illumination segments 1230 may be challenging as little to no segment boundaries may be visible in the final display to the viewer. One approach may be to replicate illuminators (corresponding to illumination segments 1230) without sharp isolation therebetween, effectively allowing guided light to spread between segments. Though light from a segment may contaminate the nearest neighbors, the overall system may provide a spatially separated illumination option for enhanced stereoscopic performance. In general, the final combined illumination may be more sufficiently uniform over the whole display, then phased, fractional duty cycle illumination operation, and may provide good viewing performance.

In another embodiment, more exact isolation may be achieved by physically separating segments with gaps that absorb or reflect light. This may be effective with dual beam illumination backlight segments, but may exacerbate edge reflection issues with both the collimated wedge type directional backlight (or simply, wedge waveguide) and the collimated optical inline directional backlight (or simply, optical valve) approaches, such as those examples discussed above. In the latter case, curved extraction features along the optical valve may reduce the edge reflection issues. Both wedge waveguide and optical valve segmentation may be achieved in the horizontal direction, and as such, may favor those panels addressed side to side rather than the more conventional left to right. However, with rotatable display devices such as handheld devices, (e.g., an iPad by Apple Inc.) this limitation may be removed.

Figure 13:
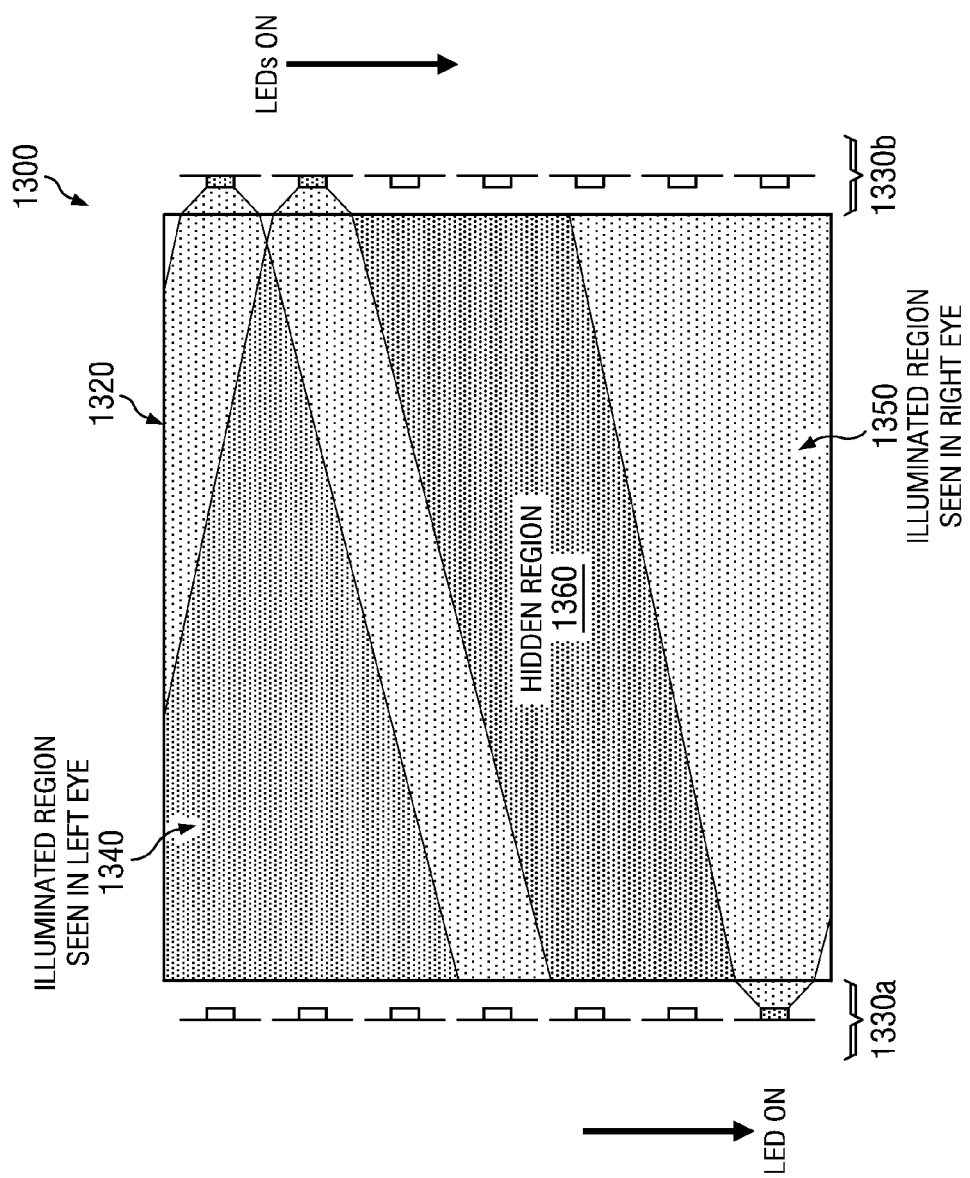
FIG. 13 is a schematic diagram illustrating one embodiment employing scrolled left and right LED driving of a dual beam illuminator (DBI) system, in accordance with the present disclosure.

One embodiment of an exemplary system constructed in accordance with the disclosed principles may modulate successive LEDs of a DBI system. LED physical positions may illuminate spatially separate regions to a level that could sufficiently isolate left and right imagery. Such an exemplary display system 1300 is illustrated in FIG. 13, and highlights the problem with the expanding guided light. As shown in FIG. 13, such an exemplary system 1300 includes a DBI backlight 1320 for directionally illuminating an LCD (not illustrated), and includes left side LEDs 1330*a* and right side LEDs 1330*b* for providing dual beam illumination. As shown, one or more of the left side LEDs 1330*a* are turned ON during illumination, in a first direction, of the portion of the scrolling display presenting the right eye image 1350, while one or more of the right side LEDs 1330*b* are turned ON during illumination, in a second direction, of the portion of the scrolling display providing the left eye image 1340. Consequently, the remaining left and right side LEDs 1330 are not illuminated in order to hide the mixed image portion 1360 of the display image. However, as also illustrated in FIG. 13, the hidden or non-illuminated region 1360 may be highly skewed along the angle(s) of illumination provided by the LEDs 1330, and may therefore be compromised when used with a horizontally line addressed scrolling display panel. To alleviate some of these issues, the LEDs 1330 can be optically collimated prior to launching light into the waveguide used in the backlight 1320. One such approach may use tapered waveguiding structures between each LED and the waveguide, however, other approaches for collimating the LED light may also be employed.

Figure 14:
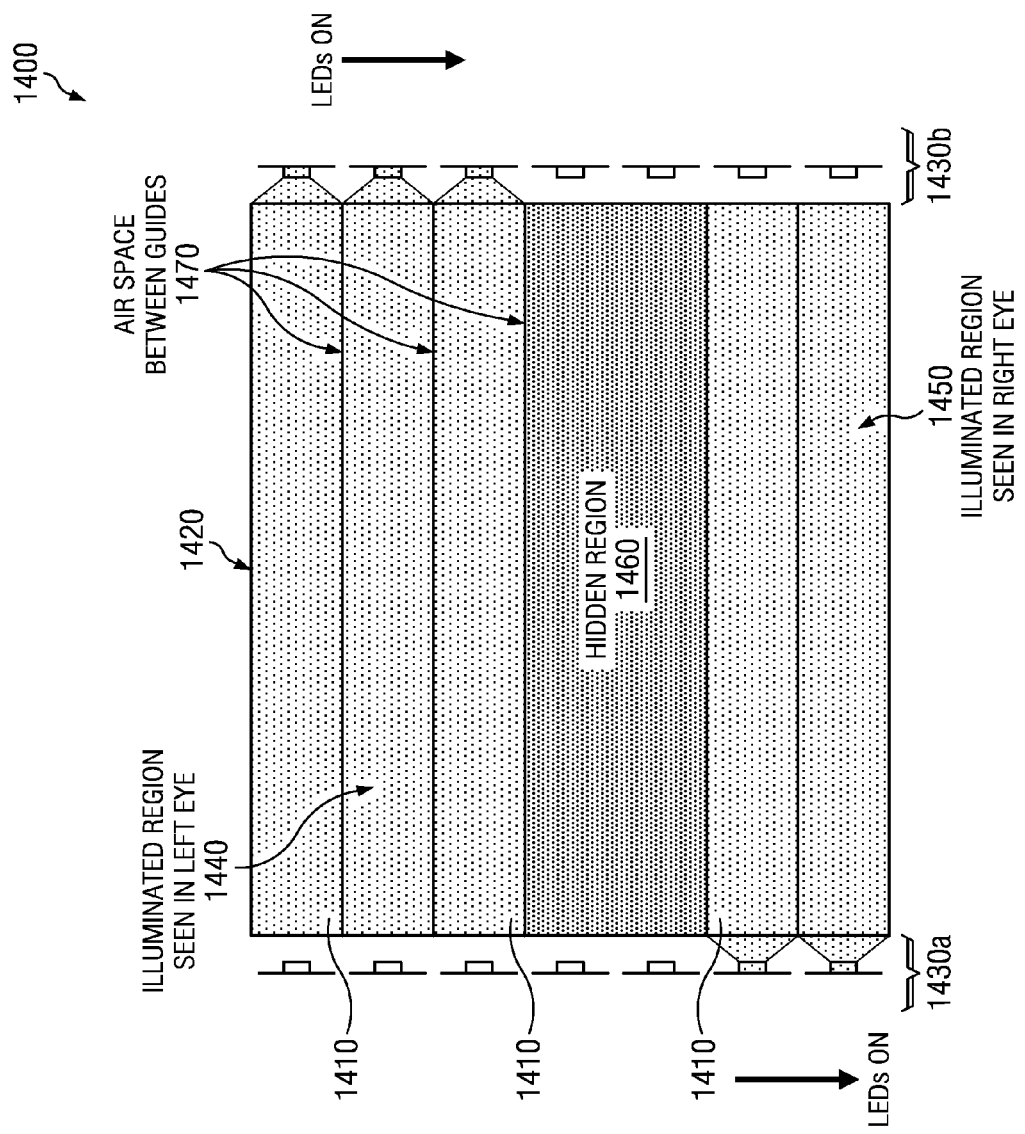
FIG. 14 is a schematic diagram illustrating one embodiment using split segments to substantially isolate DBI regions through Total Internal Reflection (TIR), in accordance with the present disclosure.

FIG. 14 sets forth another embodiment of a segmented backlighting system 1400 in accordance with the disclosed principles. This exemplary technique may isolate DBI segments by cutting the waveguide 1420 into horizontal strips or segments 1410 corresponding to left side 1430*a* and right side 1430*b* LEDs for respective right eye image 1450 and left eye image 1440 illumination. As in other DBI-based systems, the LEDs corresponding to the mixed image region are not illuminated, thus providing a hidden region 1460 in the scrolling image when the mixed left and right images are provided. With reasonable non-scattering edges provide for each strip or segment 1410, total internal reflection may be achieved that may reflect light back into each segment 1410 with little to no loss. Accordingly, the segments 1410 can be placed together within microns and still retain substantially ideal isolation. With such small boundaries and highly symmetric assembly, it may be possible to hide the boundaries from the viewer without further optical diffusion.

Figure 15:
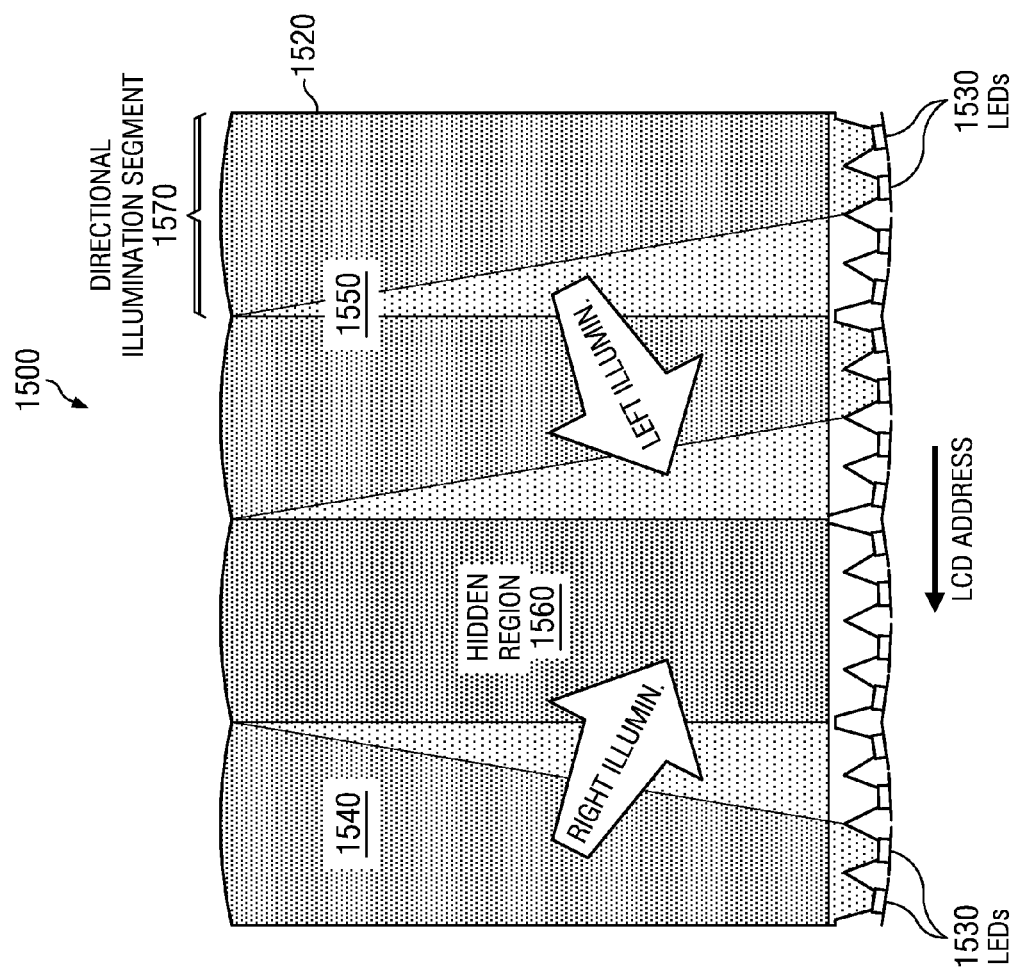
FIG. 15 is a schematic diagram illustrating one embodiment employing right to left panel addressing and vertical collimated wedge waveguide (wedge waveguide) or collimating optical valve (optical valve) illumination segments, in accordance with the present disclosure.

FIG. 15 illustrates yet another embodiment of a segmented directional backlight system 1500 in accordance with the disclosed principles. In such an embodiment, columns of either wedge waveguide or optical valve directional illumination segments 1570, with a side-to-side updated panel 1520, may be employed. In the illustrated embodiment, a single array of LEDs 1530 are employed at one end of the backlight panel 1520. These LEDs 1530 may also be directed to corresponding segments 1560, as shown in FIG. 15. Also, light from the LEDs 1530 may be collimated prior to entering the waveguide, however, while LED collimation may improve efficiency, it may not help with segment isolation. Light which fans out beyond the segment boundary(ies) may hit a curved lens at the far surface opposite the LEDs 1530, which may direct it at a return angle that may not deflect toward the viewer's eye and hence may not be seen. In this way, replication of illuminator segments 1560 within the same waveguide may be an attractive solution.

It should be noted that the use of wedge waveguide or optical valve illumination segments, as described in embodiments disclosed herein, may not detract from the ability to steer more than one illuminating beam for head movement and multiple viewer purposes, as is described in co-owned U.S. Provisional Patent Application No. 61/486,021, filed May 13, 2011, entitled "Efficient Polarized Directional Backlight", the entirety of which is herein incorporated by reference. Accordingly, the techniques disclosed herein may be combined with directional illumination techniques for use viewer tracking and other multiple viewer positional systems.

Moreover, as may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, etc. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A segmented illumination system for use with an electronic stereoscopic display system having a sequentially scanning display, the segmented illumination system comprising:
    a plurality of directional illumination segments corresponding to a plurality of display segments of the sequentially scanning display, the plurality of directional illumination segments arranged contiguously in a direction of the sequential scan;
    a plurality of illumination units corresponding to each of the plurality of directional illumination segments for providing illumination to said corresponding illumination segments, the plurality of illumination segments thereby directionally illuminating the corresponding plurality of display segments in a first or second direction, wherein the plurality of illumination segments are physically isolated from one another;
    wherein one or more first illumination units of each of said plurality of illumination units provide said illumination to corresponding one or more first directional illumination segments such that said corresponding one or more first directional illumination segments provide illumination in a first direction in synchronization with first-eye imagery provided by the corresponding plurality of display segments, and one or more second illumination units of each of the plurality of illumination units provide illumination to corresponding one or more second directional illumination segments such that said corresponding one or more second directional illumination segments provide illumination in a second direction in synchronization with second-eye imagery provided by the corresponding plurality of display segments.

2. A segmented illumination system in accordance with claim 1, wherein the first-eye and second-eye imagery is left eye and right eye imagery, and wherein the plurality of illumination segments provide left eye and right eye directional illumination to the corresponding display segments in synchronization with selected left eye and right eye imagery.

3. A segmented illumination system in accordance with claim 2, wherein the illumination system provides left eye directional illumination to one or more of a plurality of viewer left eyes and right eye directional illumination to one or more of a plurality of viewer right eyes in synchronization with selected left eye and right eye imagery.

4. A segmented illumination system in accordance with claim 1, wherein two or more of the plurality of illumination units corresponds to each of the plurality of illumination segments.

5. A segmented illumination system in accordance with claim 4, wherein said two or more illumination units provide illumination to the corresponding illumination segment at the same end of the illumination segment.

6. A segmented illumination system in accordance with claim 4, wherein at least one of the two or more illumination units provides illumination to the corresponding illumination segment at a first end of the illumination segment, and at least another one of the two or more illumination units provides illumination to the corresponding illumination segment at a second, opposing end of the corresponding illumination segment.

7. A segmented illumination system in accordance with claim 1, wherein one or more of the plurality of illumination units corresponds to each of the plurality of illumination segments, and the one or more illumination units provide illumination to each corresponding illumination segment at a first end of the illumination segments, and wherein each illumination segment comprises a corresponding curved second end, opposite each first end.

8. A segmented illumination system in accordance with claim 1, wherein said illumination units are LEDs.

9. A segmented illumination system in accordance with claim 1, wherein said display segments are liquid crystal display segments.

10. An electronic stereoscopic display system having a sequentially scanning display, the display system comprising:
    a plurality of liquid crystal display segments for providing left eye and right eye imagery in a sequential scan;
    a plurality of directional illumination segments corresponding to the plurality of liquid crystal display segments, the plurality of directional illumination segments arranged contiguously in the direction of the sequential scan;

a plurality of illumination units, one or more of the illumination units corresponding to each of the plurality of directional illumination segments for providing illumination to said corresponding directional illumination segments, the plurality of directional illumination segments thereby directionally illuminating the corresponding plurality of liquid crystal display segments in a first or second direction, wherein the plurality of illumination segments are physically isolated from one another;

wherein said plurality of illumination units provide said illumination to said corresponding directional illumination segments such that the corresponding directional illumination segments illuminate corresponding display segments in synchronization with selected left eye and right eye imagery provided by the corresponding plurality of liquid crystal display segments.

11. A display system in accordance with claim 10, wherein the illumination system provides left eye directional illumination to one or more of a plurality of viewer left eyes and right eye directional illumination to one or more of a plurality of viewer right eyes in synchronization with selected left eye and right eye imagery.

12. A display system in accordance with claim 10, wherein two or more of the plurality of illumination units corresponds to each of the plurality of illumination segments.

13. A display system in accordance with claim 12, wherein said two or more illumination units provide illumination to the corresponding illumination segment at the same end of the illumination segment.

14. A display system in accordance with claim 12, wherein at least one of the two or more illumination units provides illumination to the corresponding illumination segment at a first end of the illumination segment, and at least another one of the two or more illumination units provides illumination to the corresponding illumination segment at a second, opposing end of the corresponding illumination segment.

15. A display system in accordance with claim 10, wherein one or more of the plurality of illumination units corresponds to each of the plurality of illumination segments, and the one or more illumination units provide illumination to each corresponding illumination segment at a first end of the illumination segments, and wherein each illumination segment comprises a corresponding curved second end, opposite each first end.

* * * * *